United States Patent [19]
Harada

[11] Patent Number: 5,870,306
[45] Date of Patent: Feb. 9, 1999

[54] AUTOMATIC PROGRAMMING METHOD AND DEVICE FOR MULTI-SYSTEM MACHINE TOOL

[75] Inventor: Eiji Harada, Tokyo, Japan

[73] Assignee: Mitsubishi Denki Kabushiki Kaisha, Tokyo, Japan

[21] Appl. No.: 874,731

[22] Filed: Jun. 13, 1997

[30] Foreign Application Priority Data

Jun. 13, 1996 [JP] Japan .................................... 8-152577
May 21, 1997 [JP] Japan .................................... 9-130826

[51] Int. Cl.⁶ .................................................. G06F 19/00
[52] U.S. Cl. .............................. 364/474.11; 364/468.07; 364/474.15
[58] Field of Search .................. 364/468.01, 468.02, 364/468.03, 468.05, 468.06, 468.07, 468.08, 468.09, 468.13, 468.15, 468.18, 468.21, 468.24, 474.01, 474.02, 474.11, 474.15, 474.16–474.22, 474.24

[56] References Cited

U.S. PATENT DOCUMENTS

| 4,698,766 | 10/1987 | Entwistle et al. | 364/474.11 |
| 5,050,088 | 9/1991 | Bukler et al. | 364/474.11 |
| 5,446,669 | 8/1995 | Yamashita et al. | 364/474.11 |

FOREIGN PATENT DOCUMENTS

| 0492520 | 7/1992 | European Pat. Off. . |
| 1-295741 | 11/1989 | Japan . |
| 3-158908 | 7/1991 | Japan . |
| 4-324502 | 11/1992 | Japan . |
| 4-360747 | 12/1992 | Japan . |

Primary Examiner—Reba I. Elmore
Assistant Examiner—Thomas E. Brown
Attorney, Agent, or Firm—Sughrue, Mion, Zinn, Macpeak & Seas, PLLC

[57] ABSTRACT

An automatic programming system automatically decides which machining system should perform which machining step and generates a machining program therefor. The programming system utilizes a machining step information, a workpiece information, a tool information and a machining step corresponding workpiece information. The machining step information defines a machining step kind and a machining specification for each machining step. The workpiece information defines a workpiece material and a workpiece shape for each workpiece. The tool information defines a specification of a tool used in each machining system, a machining step kind workable and workpiece material workable by the tool. The machining step corresponding workpiece information defines a workpiece used in each machining step. Moreover, a machining system for actually performing the machining step is decided when there are plural workable machining systems on the basis of a system priority rule information which defines a preferred machining system when there are plural workable machining systems.

12 Claims, 46 Drawing Sheets

FIG.2

Machining Step Information SA

| Machining Step No. | Machining Step Kind | Position | Machining Radius | Machining Depth |
|---|---|---|---|---|
| 1 | Drilling | Z 1 0 0. | 5. | 1 0. |
| 2 | Cutting-off | Z 4 0 0. | — | — |
| 3 | Grooving | Z 3 0 0. | — | 2 0. |

FIG.3

Workpiece Information SB

| Workpiece No. | Workpiece Material | Workpiece Length | Workpiece Radius |
|---|---|---|---|
| 1 | Carbon Steel | 5 0 0. | 4 0. |
| 2 | Carbon Steel | 4 0 0. | 3 0. |

FIG.4

Tool Information SC

| System No. | In-system Tool No. | Tool Kind | Workable Step Kind | Tool Length | Tool Radius | Workable Workpiece Material |
|---|---|---|---|---|---|---|
| 1 | 1 | Drill | Drilling | 50. | 5. | Carbon Steel |
| 1 | 2 | Cutting-off Tool | Cutting-off | 100. | — | Carbon Steel |
| 2 | 1 | Drill | Drilling | 50. | 5. | Aluminium |
| 2 | 2 | Drill | Drilling | 50. | 5. | Carbon Steel |
| 2 | 3 | Grooving Tool | Grooving | 80. | — | Carbon Steel |

FIG.5

Machining Step Corresponding
Workpiece No. Information SD

| Machining Step No. | Workpiece No. |
|---|---|
| 1 | 1 |
| 2 | 2 |
| 3 | 1 |

FIG.6

Workable System and Workpiece Information SE

| Machining Step No. | System No. 1 | | System No. 2 | | Workpiece No. |
|---|---|---|---|---|---|
| | Workability | Tool No. | Workability | Tool No. | |
| 1 | ○ | 1 | ○ | 2 | 1 |
| 2 | ○ | 2 | × | — | 2 |
| 3 | × | — | ○ | 3 | 1 |

FIG.7

System Priority Decision Rule Information SF

| Rule No. | Rule |
|---|---|
| 1 | Smallest System No. has priority. |
| 2 | Largest System No. has priority. |

FIG.8

Working System and Workpiece Information SG

| Machining Step No. | Working System No. | Tool No. | Workpiece No. |
|---|---|---|---|
| 1 | 1 | 1 | 1 |
| 2 | 1 | 2 | 2 |
| 3 | 2 | 3 | 1 |

FIG.14

Machining Program for Machining Step No. "1"

| | |
|---|---|
| G28X0. Z0. ; | Reset to origin |
| G90G00X−100. Z100. ; | Position |
| G01F100. X−30. ; | Drill |
| G00X−100. ; | Return to position |
| G28X0. Z0. ; | Reset to origin |

FIG.15

Machining Program for Machining Step No. "2"

| | |
|---|---|
| G28X0. Z0. ; | Reset to origin |
| G2000. M03 ; | Rotate main spindle |
| G90G00X−100. Z400. ; | Position |
| G01F100. X5. ; | Cut off |
| G00X−100. ; | Return to position |
| G28X0. Z0. ; | Reset to origin |
| M00 ; | Stop main spindle |

FIG.16

Machining Program for Working System No. "1"

(Machining Program for Machining Step No.1)
G28X0. Z0. ;
G90G00X−100. Z100. ;
⋮
G28X0. Z0. ;

(Machining Program for Machining Step No.2)
G28X0. Z0. ;
G2000. M03 ;
⋮
M00 ;

FIG.18

Machining Step Information JA

| Machining Step No. | Machining Step Kind |
|---|---|
| 1 | A |
| 2 | B |
| 3 | C |
| 4 | B |
| 5 | A |

FIG.19

Machining Step Priority Order Rule Information JB

| Machining Step Kind | Priority Order |
|---|---|
| A | 2 |
| B | 1 |
| C | 1 |

FIG.20

Machining Step
Priority Order Information JC

| Machining Step No. | Priority Order |
|---|---|
| 1 | 2 |
| 2 | 1 |
| 3 | 1 |
| 4 | 1 |
| 5 | 2 |

FIG.21

Working System Information JE

| Machining Step No. | Working System No. |
|---|---|
| 1 | 1 |
| 2 | 1 |
| 3 | 1 |
| 4 | 2 |
| 5 | 2 |

FIG.22

Machining Order Rule Information JD
 for Same Priority Order Machining Step

| Rule No. | Rule |
|---|---|
| 1 | Give Priority to Machining Step of smallest Machining Step No. |
| 2 | Give Priority to Machining Step of largest Machining Step No. |

FIG.23

In-system Machining Order Information JF

| Machining Step No. | Priority Order |
|---|---|
| 2 | 1 |
| 3 | 1 |
| 1 | 2 |

FIG.27

In-system Machining Order Information JF1

| Machining Step No. | Priority Order |
|---|---|
| 1 | 2 |
| 0 | 0 |
| 0 | 0 |

FIG.28

In-system Machining Order Information JF2

| Machining Step No. | Priority Order |
|---|---|
| 2 | 1 |
| 1 | 2 |
| 0 | 0 |

FIG.29

In-system Machining Order Information JF3

| Machining Step No. | Priority Order |
|---|---|
| 2 | 1 |
| 3 | 1 |
| 1 | 2 |

FIG.30

Working System Information JE

| Machining Step No. | Working System No. |
|---|---|
| 2 | 1 |
| 3 | 1 |
| 1 | 1 |
| 4 | 2 |
| 5 | 2 |

FIG.32

Machining Step Information PA

| Machining Step No. | Machining Step Kind | Machining Speed | Start Position | End Position | Machining Depth |
|---|---|---|---|---|---|
| 1 | Drilling | 2 | Z350 | Z350 | 3 2 |
| 2 | Drilling | 2 | Z150 | Z150 | 3 0 |
| 3 | Drilling | 2 | Z250 | Z250 | 3 2 |
| 4 | Grooving | 5 0 | Z100 | Z400 | 3 5 |
| 5 | Rough Lathe Turning | 5 0 | Z0 | Z450 | 3 9 |
| 6 | Cutting-off | 2 | Z10 | Z10 | — |

FIG.33

In-system Machining Step Priority Order Rule Information PB

| Machining Step Kind | In-system Priority Order |
|---|---|
| Cutting-off | 4 |
| Drilling | 3 |
| Grooving | 2 |
| Rough Lathe Turning | 1 |

FIG.34

In-system Machining Step Priority Order Information PC

| Machining Step No. | In-system Priority Order |
|---|---|
| 1 | 3 |
| 2 | 3 |
| 3 | 3 |
| 4 | 2 |
| 5 | 1 |
| 6 | 4 |

FIG.35

Working System Information PE

| Machining Step No. | Working System No. |
|---|---|
| 1 | 1 |
| 2 | 2 |
| 3 | 1 |
| 4 | 1 |
| 5 | 2 |
| 6 | 2 |

FIG.36

Machining Order Rule Information PD
for Machining Steps of Same In-system Priority Order

| Rule No. | Rule |
|---|---|
| 1 | Give Priority to Machining Step of smallest Machining Step No. |
| 2 | Give Priority to Machining Step of largest Machining Step No. |

FIG.37

In-system Machining Order Information PF

| Machining Step No. | In-system Priority Order |
|---|---|
| 4 | 2 |
| 1 | 3 |
| 3 | 3 |

FIG.38

Inter-system Machining Step
Priority Order Rule Information PG

| Machining Step Kind | Inter-system Priority Order |
|---|---|
| Cutting-off | 2 |
| Drilling | 2 |
| Grooving | 2 |
| Rough Lathe Turning | 1 |

FIG.39

Inter-system Machining Step Priority Order Information PH

| Machining Step No. | Inter-system Priority Order |
|---|---|
| 1 | 2 |
| 2 | 2 |
| 3 | 2 |
| 4 | 2 |
| 5 | 1 |
| 6 | 2 |

FIG.40

Machining Mode Rule Information P I

| Machining Step Kind | Machining Mode |
|---|---|
| Cutting-off | Workpiece Rotating |
| Drilling | Workpiece Non-rotating |
| Grooving | Workpiece Non-rotating |
| Rough Lathe Turning | Workpiece Rotating |

FIG.41

Machining Mode Information PJ

| Machining Step No. | Machining Mode |
|---|---|
| 1 | Workpiece Non-rotating |
| 2 | Workpiece Non-rotating |
| 3 | Workpiece Non-rotating |
| 4 | Workpiece Non-rotating |
| 5 | Workpiece Rotating |
| 6 | Workpiece Rotating |

FIG.42

Machining Time Information PK

| Machining Step No. | Machining Time |
|---|---|
| 1 | 6 |
| 2 | 5 |
| 3 | 6 |
| 4 | 6 |
| 5 | 9 |
| 6 | 6 |

FIG.43

Machining Order Rule Information PL for Machining Steps of Same Inter-system Priority Order

| Rule No. | Rule |
|---|---|
| 1 | Give Priority to Machining Step of smallest System No. |
| 2 | Give Priority to Machining Step of largest System No. |

FIG.44

Machining Step Waiting Order Information PM

| Machining Step No. | Working System No. | Pre-machining Waiting No. | Post-machining Waiting No. |
|---|---|---|---|
| 4 | 1 | 1 ( Machining Order ) | 2 ( Tool Interference ) |
| 1 | 1 | — | — |
| 3 | 1 | — | 3 ( Machining Mode ) |
| 5 | 2 | — | 1 ( Machining Order ) |
| 2 | 2 | 2 ( Tool Interference ) | — |
| 6 | 2 | 3 ( Machining Mode ) | — |

FIG.45

Workpiece Information PN

| Workpiece No. | Workpiece Length | Workpiece Radius |
|---|---|---|
| 1 | 500 | 40 |
| 2 | 400 | 30 |

In-system Machining Order Information PF1

| Machining Step No. | In-system Priority Order |
|---|---|
| 1 | 3 |
| 0 | 0 |
| 0 | 0 |

FIG.50

In-system Machining Order Information PF2

| Machining Step No. | In-system Priority Order |
|---|---|
| 1 | 3 |
| 3 | 3 |
| 0 | 0 |

FIG.51

In-system Machining Order Information PF3

| Machining Step No. | In-system Priority Order |
|---|---|
| 4 | 2 |
| 1 | 3 |
| 3 | 3 |

FIG.52

Working System Information PF1

| Machining Step No. | Working System No. |
|---|---|
| 4 | 1 |
| 1 | 1 |
| 3 | 1 |
| 5 | 2 |
| 2 | 2 |
| 6 | 2 |

FIG.63

Machining Program for Machining Step No. "1"

Machining Program for Machining Step No. "6"

Machining Program for Working System No. "1"

```
! 2 L 1
    (Machining Program for Machining Step No. "4" )
    G28X0.Z0.;
    G90G00X-100.Z100.;
         ⋮
    G28X0.Z0.;

! 2 L 2
    (Machining Program for Machining Step No. "1" )
    G28X0.Z0.;
    G90G00X-100.Z350.;
         ⋮
    G28X0.Z0.;

(Machining Program for Machining Step No. "3" )
    G28X0.Z0.;
    G90G00X-100.Z250.;
         ⋮
    G28X0.Z0.;

Machining Program for Working System No. "2"

(Machining Program for Machining Step No. "5" )
```
G28X0.Z0.;
S2000.M03.;
    ⋮
G28X0.Z0.;
```

! 1 L 1
! 1 L 2
   (Machining Program for Machining Step No. "2" )
```
G28X0.Z0.;
G90G00X-100.Z150.;
    ⋮
G28X0.Z0.;
```

! 1 L 3
   (Machining Program for Machining Step No. "6" )
```
G28X0.Z0.;
S2000.M03.;
    ⋮
G28X0.Z0.;
```

AUTOMATIC PROGRAMMING METHOD AND DEVICE FOR MULTI-SYSTEM MACHINE TOOL

BACKGROUND OF THE INVENTION

1. Field of the Invention

This invention relates to an automatic programming method and device for multi-system machine tools. Particularly, it relates to a programming method and device for automatically deciding a machining system to handle a particular machining step, deciding a machining order in the machining step or deciding a waiting order between an interfering machining systems, on the basis of machining informations including a machining step information, thereby generating a machining program based on such informations. The method and device is applicable to NC machine tool, Electric Discharge Machine and the like.

2. Description of Related Art

FIG. 67 exemplifies an automatic programming device for multi-system machine tools in the related art. An operator inputs machining informations such as a machining step information and the like into an automatic programming information control unit 1 through an input unit 3 and an input control unit 4. A machining program control unit 2 generates a machining program on the basis of the machining informations. Thus generated machining program is stored in a memory 8 such as a semiconductor memory device or a hard disk via a memory control unit 7. The operator carries out such successive operations interactively while seeing a screen of a display 6 such as CRT which is connected to a display control unit 5.

A multi-system machining program is generated as follows in the automatic programming device in the related art.

First, the operator inputs a work information, tool informations for respective systems, a machining step information, etc. Then, the operator inputs them through the input unit 3 while checking the input informations via the display 6. The work information, tool informations, machining step information and the like are input thereafter in the automatic programming information control unit 1 from the input control unit 4.

However, a machining program for each system cannot be generated only with the above processes. This is because there remain several matters to be decided. Namely, it should be further determined which machining system is available for each machining step, which machining system should be used for the machining, in which order a plurality of machining steps should be performed in the same system.

Therefore, the operator has to determine first of all which system can handle a desired machining step wherein a particular workpiece and tool are defined in the workpiece information and tool information for each system or the like. For example, in case of drilling, the machining system must have at least one drilling tool, and the tool must have the same diameter as a diameter of a hole to be drilled. If none of the systems is suitable for the machining, the operator must change or add workpieces or tools. Namely, the operator has to consider a variety of things mentioned above.

If a plurality of systems are suitable for machining, the operator must decide only one system for actually performing the machining. For example, he or she determines that, if the first system and the second system are available for a particular machining step, such a machining step should be always treated by the first system. After the operator finishes deciding machining systems which should handle respective machining steps, he or she is required to determine an order of the machining steps in each of the systems. For example, the operator determines that a drilling step should be done always after a grooving step. When the operator decides all the above matters, preparation for generating a machining program for each system is completed.

Then, the automatic programming information control unit 1 outputs the given machining step information, workpiece information and tool information to the machining program control unit 2. The automatic programming information control unit 1 also outputs the information showing which system be assigned to which machining step and the machining order information in each system, both of which are determined by the operator. The machining program control unit 2 generates machining programs for the machining systems, respectively, on the basis of the above informations. The machining programs for the respective systems are stored in the memory 8 through the memory control unit 7.

However, with the automatic programming device of the related art, the operator has to decide and input the above mentioned various matters in advance: which system is available for which machining step, which system should perform that specific machining step if there are plural systems available, in what order the machining steps should be treated in that machining system, etc. Accordingly, it is impossible to make up the machining program for each system until the input work of the above matters is finished.

In addition, another work is required after the operator has decided the machining order in the system and starts machining with plural machining systems at the same time. Namely, he or she must check whether or not it is possible to perform a machining step in one system simultaneously with a machining step in another system. If it is impossible, the operator has to decide a waiting order between the interfering systems, i.e. which system should wait which system. If the program for multi-system machine tool is carried out without such waiting operation, tools may collide with each other. Otherwise, machining becomes impossible with respect to the machining steps which can be performed provided that machinings in the other machining system are completed.

For example, in case of machining the same workpiece in one and the other machining steps which belong to different systems, it is necessary to carry out a step for rough machining before the other machining step. If the other machining step is performed before the rough machining, cutting may be so large that a tool is possibly damaged. In this case, any steps other than the rough machining step should wait completion of that rough machining step. Thus, there arises a necessity for waiting in machining steps which belong to different systems.

Moreover, it is impossible to carry out a machining step in which the workpiece is machined while being rotated at the same time with a machining step in which the workpiece is machined without rotation. Accordingly, unless the machining step to be treated first in one system is completed, the machining step treated in the other system cannot be started. Thus, there is another necessity for waiting in machining steps which belong to different systems.

Furthermore, if there is a possibility that tools interfere with each other in case of performing plural machining steps, unless the machining step to be treated first in one system is completed, the machining step treated in the other system should not be started to prevent collision of the tools. Thus, there is further necessity for waiting in machining steps which belong to different systems. As mentioned above, the operator must consider various conditions for waiting between machining steps handled by different systems in order to designate a machining order therein. Namely, in the automatic programming device for multi-system machine tool of the related art, the operator has to judge and input beforehand all troublesome works by himself or herself, such as a machining order in a machining system, a waiting order between different machining systems and the like.

As mentioned above, the operator needs to do many works for preparation of generating the machining programs for the systems. Therefore, the machining program preparing work depends much upon operator's skill. If the decisions are wrong or improper in such preparatory works, several problems arise. For example, the tool undergoes excessive load and damaged in a short time, machining accuracy of the workpiece is lowered, or the machining becomes impossible at worst. Therefore, the operator is required to be highly skilled. As a result, efficiency for generating the machining programs is very low.

On the other hand, Japanese Patent Publication (Kokai) No. 4-360749 discloses a device in which an operator inputs data of all machining shapes of through holes machined in a combined machining. Then, the device automatically divides the machining shape data into the first machining data and the second machining data to generate a program. However, with such an automatic machining step deciding method, the operator must judge and input several things when performing various machining with the multi-system tool machine, as in the above mentioned related art. Namely, he or she has to determine beforehand which system is available for which machining step, which system should perform that machining step if there are plural systems available, in what order the machining steps should be treated in the system, etc.

SUMMARY OF THE INVENTION

It is a first object of the invention to provide an automatic programming method and device for multi-system machine tools that is able to automatically decide which system is available for machining of which machining step.

It is a second object of the invention to provide an automatic programming method and device for multi-system machine tools that is able to automatically decide a machining order of all machining steps handled in a machining system, when all those machining steps are assigned to that system.

It is a second object of the invention to provide an automatic programming method and device for multi-system machine tools that is able to automatically decide a waiting order between different machining systems.

According to one preferred mode of the invention, there is provided an automatic programming method for a multi-system machining tool, for machining one of a predetermined workpieces by predetermined machining steps with at least one of predetermined machining systems. The method comprises a workable system deciding step for deciding a machining system workable for each of the predetermined machining steps, among the predetermined machining systems, on the basis of at least a machining step information, a workpiece information, a tool information and a machining step corresponding workpiece information. The machining step information defines a machining step kind and a machining specification for each of the predetermined machining steps. The workpiece information defines a workpiece material and a workpiece shape for each of the predetermined workpieces. The tool information defines a specification of a tool used in each of the predetermined machining systems, a machining step kind workable by the tool and a workpiece material workable by the tool. The machining step corresponding workpiece information defines a workpiece used in each of the predetermined machining steps. Moreover, the method comprises a working system deciding step for deciding a machining system for actually working on one of the predetermined machining steps when there are plural workable machining systems for the one machining step on the basis of a system priority rule information. The system priority rule information defines a preferred machining system when there are plural workable machining systems for one of the predetermined machining steps.

According to one preferred mode of the invention, there is provided an automatic programming device for a multi-system machining tool, for machining one of a predetermined workpieces by predetermined machining steps with at least one of predetermined machining systems. The device comprises workable system deciding means for deciding a machining system workable for each of the predetermined machining steps, among the predetermined machining systems, on the basis of at least a machining step information, a workpiece information, a tool information and a machining step corresponding workpiece information. The machining step information defines a machining step kind and a machining specification for each of the predetermined machining steps. The workpiece information defines a workpiece material and a workpiece shape for each of the predetermined workpieces. The tool information defines a specification of a tool used in each of the predetermined machining systems, a machining step kind workable by the tool and a workpiece material workable by the tool. The machining step corresponding workpiece information defines a workpiece used in each of the predetermined machining steps. The device further comprises machining system assigning means for deciding a machining system for actually working on one of the predetermined machining steps when there are plural workable machining systems for the one machining step on the basis of an information outputted from the workable system deciding means and a system priority rule information. The system priority rule information defines a preferred machining system when there are plural workable machining systems for one of the predetermined machining steps.

According to another preferred mode of the invention, there is provided an automatic programming method for a multi-system machining tool, for machining one of predetermined workpieces by predetermined machining steps with predetermined machining systems. The method comprises an in-system priority order deciding step for deciding an in-system priority order corresponding to each of the predetermined machining steps on the basis of at least a machining step information and an in-system machining step priority order rule information. The machining step information defines a machining step kind and a machining specification for each of the predetermined machining steps. The in-system machining step priority order rule information defines the in-system priority order for the machining step kind of each of the predetermined machining steps. The method further comprises an in-system machining order deciding step for deciding an in-system machining order between machining steps handled by a same machining system, on the basis of a first machining order rule information and a working system information. The first machining order rule information defines a preferred machining step if there are plural machining steps having the same in-system priority order. The working system information defines machining systems for actually working on the predetermined machining steps, respectively. The method further comprises an inter-system priority order deciding step for deciding an inter-system priority order corresponding to each of the predetermined machining steps on the basis of the machining step information and an inter-system machining step priority order rule information. The inter-system machining step priority order rule information defines the inter-system priority order for the machining step kind of each of the predetermined machining steps. The method further comprises a machining time calculating step for calculating a machining time for each of the predetermined machining steps on the basis of the machining step information. The method further comprises a waiting order deciding step for deciding a waiting order between machining steps handled by different machining system on the basis of the machining step information, the in-system machining order decided in the in-system machining order deciding step, the inter-system priority order decided in the inter-system machining step priority order deciding step, a second machining order rule information and the machining time decided in the machining time calculating step. The second machining order rule information defines a preferred machining step if there are plural machining steps having the same inter-system priority order.

According to another preferred mode of the invention, there is provided an automatic programming device for a multi-system machining tool, for machining one of predetermined workpieces by predetermined machining steps with predetermined machining systems. The device comprises an in-system machining step priority order deciding unit for deciding an in-system priority order corresponding to each of the predetermined machining steps on the basis of at least a machining step information and an in-system machining step priority order rule information. The machining step information defines a machining step kind and a machining specification for each of the predetermined machining steps. The in-system machining step priority order rule information defines the in-system priority order for the machining step kind of each of the predetermined machining steps. The device further comprises an in-system machining order deciding unit for deciding an in-system machining order between machining steps handled by a same machining system, on the basis of the in-system priority order decided by the in-system machining step priority order deciding unit, a first machining order rule information and a working system information. The first machining order rule information defines a preferred machining step if there are plural machining steps having the same in-system priority order. The working system information defines machining systems for actually working on the predetermined machining steps, respectively. The device further comprises an inter-system machining step priority order deciding unit for deciding an inter-system priority order corresponding to each of the predetermined machining steps on the basis of the machining step information and an inter-system machining step priority order rule information. The inter-system machining step priority order rule information defines the inter-system priority order for the machining step kind of each of the predetermined machining steps. The device further comprises a machining mode deciding unit for deciding a machining mode corresponding to each of the predetermined machining steps on the basis of a machining mode rule information. The machining mode rule information defines the machining mode for the machining step kind of each of the predetermined machining steps. The device further comprises a machining time calculating unit for calculating a machining time for each of the predetermined machining steps on the basis of the machining step information. The device further comprises an inter-system waiting order deciding unit for deciding a waiting order between machining steps handled by different machining systems on the basis of the machining step information, the working system information, the inter-system machining step priority order information, the machining time decided by the machining time calculating unit and a second machining order rule information. The second machining order rule information defines a preferred machining step if there are plural machining steps having the same inter-system priority order.

Further objects and advantages of the invention will be apparent from the following description, reference being had to the accompanying drawings, wherein preferred embodiments of the invention are clearly shown.

BRIEF DESCRIPTION OF THE DRAWINGS

FIG. 2 is a table showing an example of a machining step information according to the first embodiment of the invention.

FIG. 3 is a table showing an example of a workpiece information according to the first embodiment of the invention.

FIG. 4 is a table showing an example of a tool information according to the first embodiment of the invention.

FIG. 5 is a table showing an example of a machining step corresponding workpiece information according to the first embodiment of the invention.

FIG. 6 is a table showing an example of a workable system and workpiece information according to the first embodiment of the invention.

FIG. 7 is a table showing an example of a system priority order decision rule information according to the first embodiment of the invention.

FIG. 8 is a table showing an example of a working system and workpiece information according to the first embodiment of the invention.

FIG. 14 is a chart showing an example of a program for drilling according to the first embodiment of the invention.

FIG. 15 is a chart showing an example of a program for cutting-off according to the first embodiment of the invention.

FIG. 16 is a chart showing an example of a machining program collecting the programs of FIG. 14 and FIG. 15 into the same working system according to the first embodiment of the invention.

FIG. 18 is a table showing an example of a machining step information according to the second embodiment of the invention.

FIG. 19 is a table showing an example of a machining step priority order rule information according to the second embodiment of the invention.

FIG. 20 is a table showing an example of a machining step priority order information according to the second embodiment of the invention.

FIG. 21 is a table showing an example of a working system information according to the second embodiment of the invention.

FIG. 22 is a table showing an example of a machining order rule information for the same priority order machining steps according to the second embodiment of the invention.

FIG. 23 is a table showing an example of an in-system machining order information according to the second embodiment of the invention.

FIG. 27 is a table showing an example of an in-system machining order information according to the second embodiment of the invention.

FIG. 28 is a table showing an example of an in-system machining order information according to the second embodiment of the invention.

FIG. 29 is a table showing an example of an in-system machining order information according to the second embodiment of the invention.

FIG. 30 is a table showing an example of a working system information according to the second embodiment of the invention.

FIG. 32 is a table showing an example of a machining step information according to the third embodiment of the invention.

FIG. 33 is a table showing an example of an in-system machining step priority order rule information according to the third embodiment of the invention.

FIG. 34 is a table showing an example of an in-system machining step priority order information according to the third embodiment of the invention.

FIG. 35 is a table showing an example of a working system information according to the third embodiment of the invention.

FIG. 36 is a table showing an example of a machining order rule information for the same in-system priority order machining steps according to the third embodiment of the invention.

FIG. 37 is a table showing an example of an in-system machining order information according to the third embodiment of the invention.

FIG. 38 is a table showing an example of an inter-system machining step priority order rule information according to the third embodiment of the invention.

FIG. 39 is a table showing an example of an inter-system machining step priority order information according to the third embodiment of the invention.

FIG. 40 is a table showing an example of a machining mode rule information according to the third embodiment of the invention.

FIG. 41 is a table showing an example of a machining mode information according to the third embodiment of the invention.

FIG. 42 is a table showing an example of a machining time information according to the third embodiment of the invention.

FIG. 43 is a table showing an example of a machining order rule information for the same inter-system priority order machining steps according to the third embodiment of the invention.

FIG. 44 is a table showing an example of a machining step waiting order information according to the third embodiment of the invention.

FIG. 45 is a table showing an example of a workpiece information according to the third embodiment of the invention.

FIG. 50 is a table showing an example of an in-system machining order information according to the third embodiment of the invention.

FIG. 51 is a table showing an example of an in-system machining order information according to the third embodiment of the invention.

FIG. 52 is a table showing an example of a working system information according to the third embodiment of the invention.

FIG. 63 is a chart showing an example of a program for drilling according to the third embodiment of the invention.

FIG. 64 is a chart showing an example of a program for cutting-off according to the third embodiment of the invention.

FIG. 65 is a chart showing an example of a machining program collecting the programs of FIG. 63 and other related machining steps into a working system "1" according to the third embodiment of the invention.

FIG. 66 is a chart showing an example of a machining program collecting the programs of FIG. 64 and other related machining steps into a working system "2" according to the third embodiment of the invention.

DESCRIPTION OF THE PREFERRED EMBODIMENTS

Figure 1:
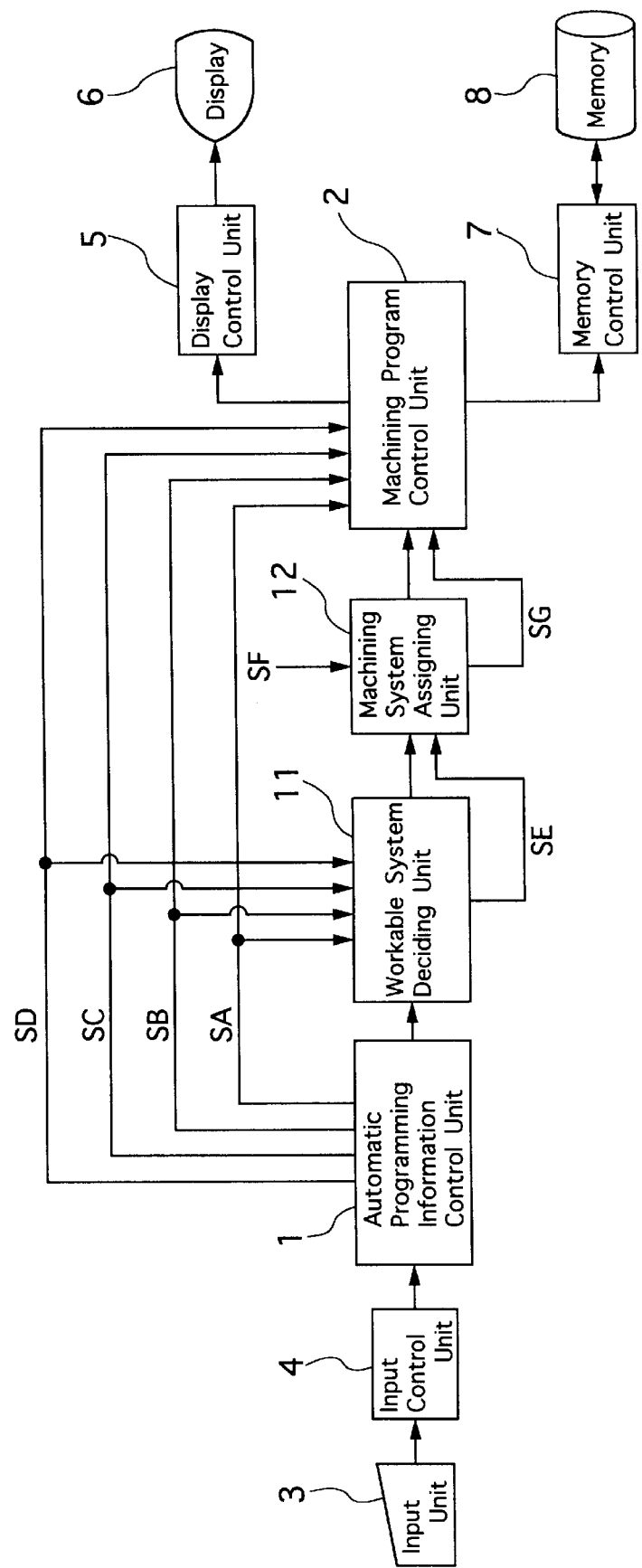
FIG. 1 is a block diagram showing an automatic programming device for multi-system machine tool according to a first embodiment of the invention.

Preferred embodiments of the invention are described hereafter referring to the attached drawings. In the drawings, the same reference numeral or mark indicates the same or corresponding part or element throughout the description of each embodiment, including the description of the related art.

FIG. 1 shows the inventive automatic programming device. A workable system deciding unit 11 decides which machining system is available for which machining step, on the basis of a machining information SA, workpiece information SB, tool information SC and machining step corresponding workpiece information SD, thereby generating a workable system and workpiece information SE. The deciding unit 11 writes a tool number in the information SE at the same time if it is workable.

A machining system assigning unit 12 reads out a workable system and a tool number for a machining step from the workable system and workpiece information SE. If there are plural systems available for the machining, the assigning unit 12 assigns only one system for performing the machining on the basis of a system priority order decision rule information SF. Then, the assigning unit 12 generates a working system and workpiece information SG which has a machining step number, working system number, tool number and workpiece number for the machining. If the machining step can be carried out by only one system, the assigning unit 12 allocates the number of that machining system as the working system number. If there is no workable system, the assigning unit 12 does not write any information in the working system and workpiece information SG. Otherwise, the assigning unit 12 may be structured so as to write a fact that there is no system available.

FIG. 2 shows an example of the machining step information SA. FIG. 2 shows an information for each machining step in case a workpiece is machined by one or more machining steps. In this example, the machining step information SA is constituted by a machining step number, machining step kind, position, machining radius and machining depth. The machining step information SA may include other informations than the above. The position, machining radius and machining depth define a machining specification in this embodiment. There are exemplified a "drilling", "cutting-off", "grooving" and the like as the machining step kind. For example, in case of the machining step of the number "1", the machining step kind is "drilling", the position is "100" in the Z-direction, the machining radius is "5" and the machining depth is "10". Some machining step numbers lack a part of data, depending on the machining step kind. For example, in case the machining step kind is "cutting-off", there are no data about the machining radius and the machining depth where a symbol "-" is inserted.

FIG. 3 shows an example of the workpiece information SB. In this example, the workpiece information SB is constituted by a workpiece number, a workpiece material, a workpiece length and a workpiece radius. The workpiece length and workpiece radius define a workpiece shape in this embodiment. For example, in case of the workpiece of the number "1", the workpiece material is "carbon steel", the workpiece shape is "cylinder" which has a length of "500" and a diameter of "40".

FIG. 4 shows an example of the tool information SC which stores data of tools. In this example, the tool information SC is constituted by a system number, in-system tool number, tool kind, workable step kind, tool length, tool radius and workable workpiece material. The tool length and tool radius define a tool specification in this embodiment. For example, in case of the tool of the system number "1" and in-system tool number "1", the tool kind is "drill", the workable step kind is "drilling", the tool length is "50", the tool radius is "5", and the workable workpiece material is "carbon steel". Some tools lack a part of data, depending on the tool kind. For example, in case the system number is "1" and the in-system tool number is "2", there are no data about the tool radius where a symbol "-" is inserted.

Moreover, in some cases, the tool length and the tool radius of the information SC shown in FIG. 4 may have different meanings depending on the tool kind. For example, the length of the drill means a depth of a hole which the drill can bore, and the length of the cutting-off tool in a lathe machining means a radius of a workpiece which the tool can cut off.

FIG. 5 shows an example of the machining step corresponding workpiece information SD which stores data of workpieces to be machined in respective machining steps. In this example, workpiece numbers are fixed corresponding to machining step numbers, and the workpiece numbers of "1", "2" and "1" are allocated to the machining step numbers "1", "2" and "3".

It is necessary to input the machining step information SA, workpiece information SB, tool information SC and machining step corresponding workpiece information SD in the workable system deciding unit 11 and the machining program control unit 2 through the input unit 3, input control unit 4 and automatic programming information control unit 1. As regards the workpiece, it is necessary to determine beforehand which workpiece should be selected in the workpiece information SB, corresponding to respective machining steps, as shown in the machining step corresponding workpiece information SD of FIG. 5.

FIG. 6 shows an example of the workable system and workpiece information SE which stores data representing which system is available for which machining step and which workpiece is machined in each machining step. In this example, the workable system and workpiece information SE is constituted by a machining step number, system number, workability that means whether the system is workable "0" for the machining or non-workable "X", tool number in case the machining is possible, and a workpiece number. There is a case in which one machining step can be carried out by plural systems. For example, the machining step of the number "1" can be performed by either of the system numbers "1" and "2".

FIG. 7 shows an example of the system priority order decision rule information SF which stores rules used in determining which system should be utilized for one machining step when plural systems are available for the machining step. The system priority order decision rule information SF is also input beforehand along with the informations SA, SB, SC and SD in the assigning unit 12 through the input unit 3, input control unit 4 and automatic programming information control unit 1. In this example, the system priority order decision rule information SF is constituted by a rule number and rule. For example, the rule of number "1" prefers a system of the smallest number among workable systems. The rule of number "2" prefers a system of the largest number among workable systems. Otherwise, it is possible to form a priority rule by combining several conditions such as a life of a machining tool, horsepower of a machine installed in the system, hardness of a workpiece material, etc. It is determined in advance which rule should be adopted among these rules.

FIG. 8 shows an example of the working system and workpiece information SG which stores data representing which machining system should actually work on which machining step. In this example, the working system and workpiece information SG is constituted by a machining step number, working system number, tool number and workpiece number. For example, the machining step of number "1" is carried out by the system of number "1", the number of the tool used therefor is "1" and the workpiece number is "1".

The machining program control unit 2 is informed of a system for carrying out a machining from the working system and workpiece information SG. Then, the control unit 2 generates machining programs for respective systems on the basis of the machining step information SA, workpiece information SB, tool information SC and machining step corresponding workpiece information SD, thereby storing the generated programs in the memory 8 through the memory control unit 7.

An operation of the automatic programming device is described hereafter.

In the following example, a lathe is used as a machine tool, and a cylindrical workpiece is grasped by a chuck. Then, a tool is moved to the workpiece in a perpendicular direction to an axis thereof, thereby drilling or grooving it or cutting it off.

Figure 9:
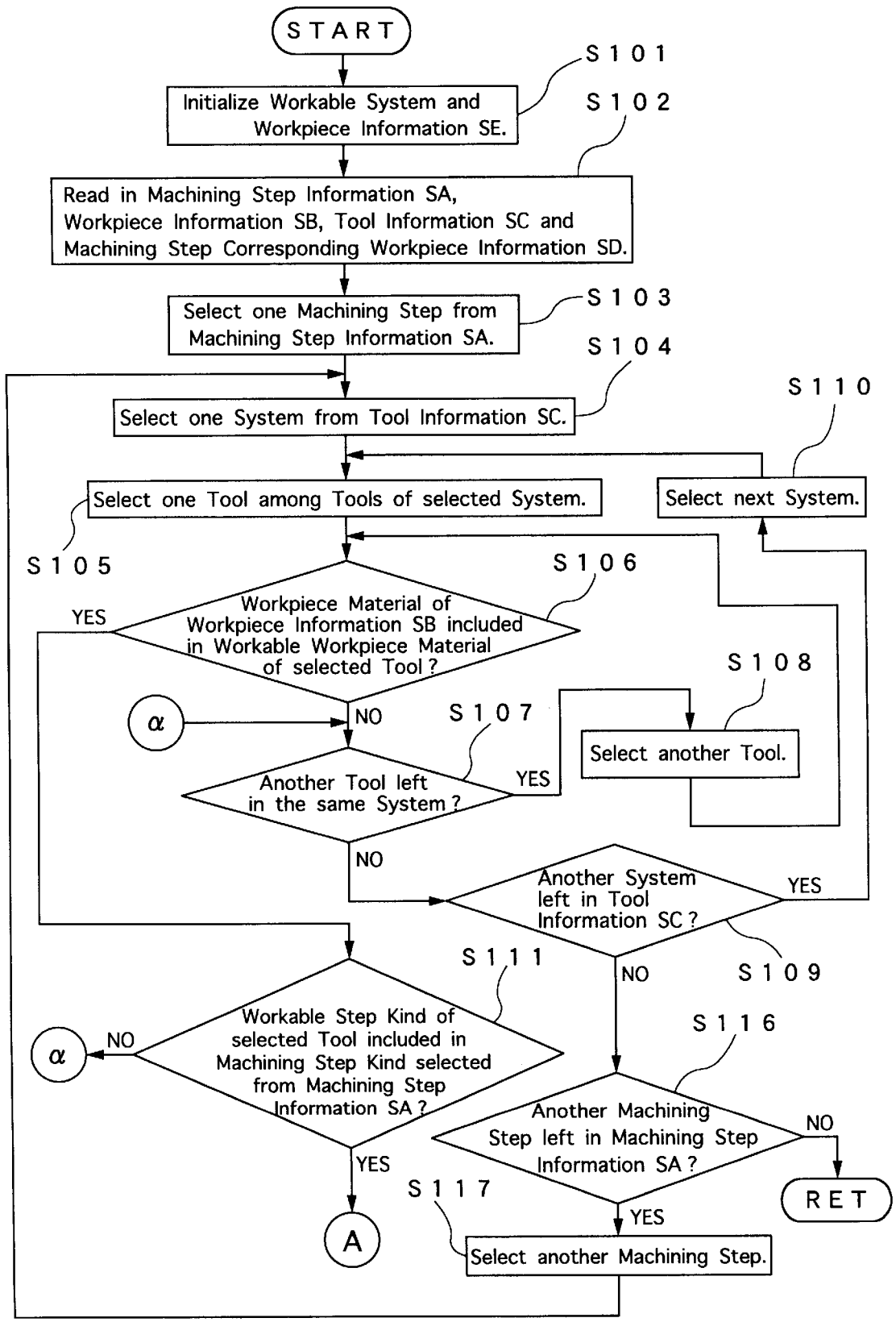
FIG. 9 to FIG. 11 are flowcharts showing an operation of a workable system deciding unit according to the first embodiment of the invention.
Figure 10:
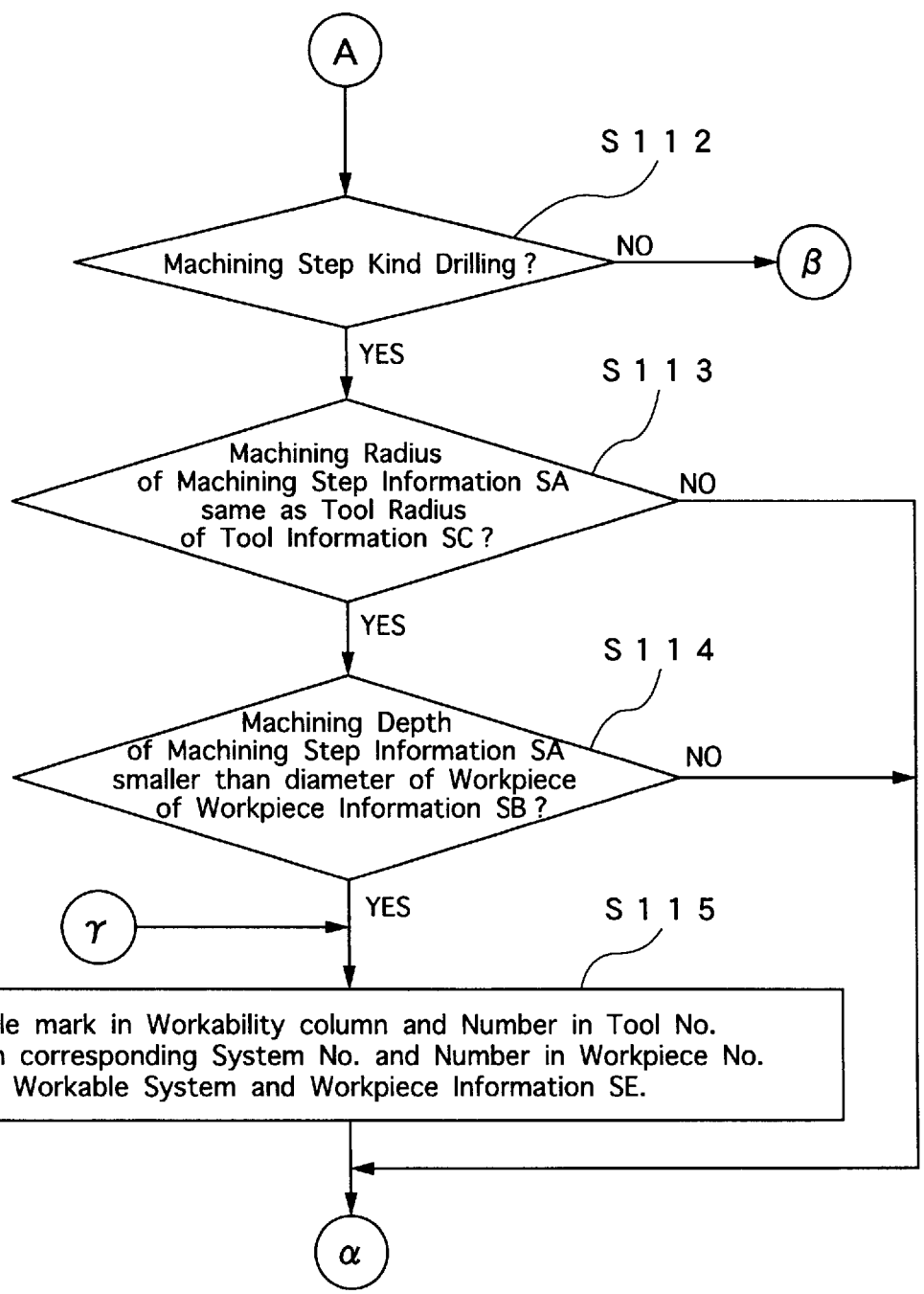
Figure 11:
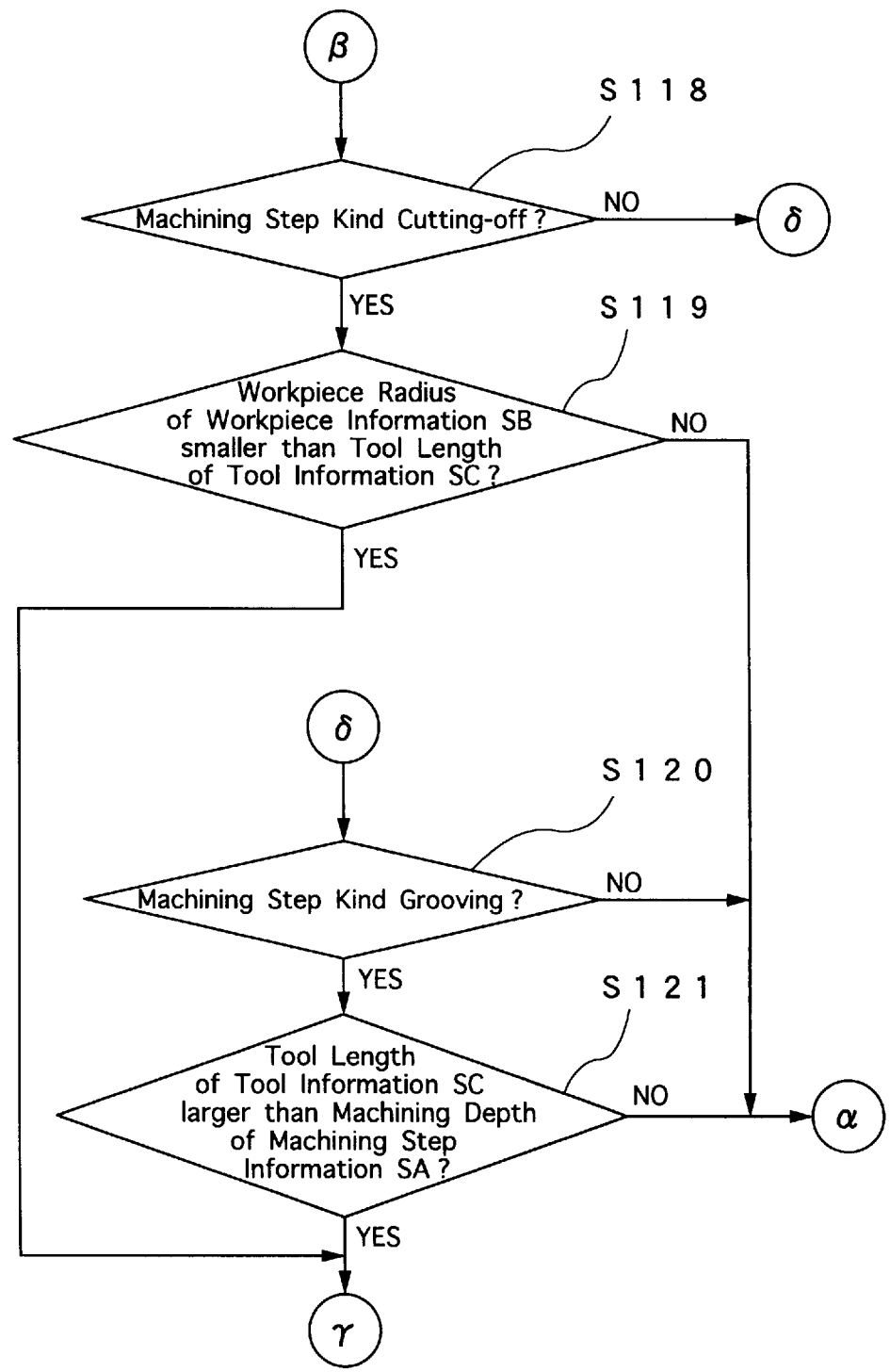

FIGS. 9–11 show an operation of the workable system deciding unit 11.

First, in step S101, the workable system and workpiece information SE is initialized. For example, the deciding unit 11 writes "non-workable (X)" in the workability column, "0" in the tool number column and "0" in the workpiece number column in the information SE as an initial state. This is done for all machining steps of the information SE which correspond to all the machining steps stored in the information SA. In step S102, the deciding unit 11 reads a machining step kind, position, machining radius and machining depth corresponding to each machining number from the machining step information SA. The deciding unit 11 also reads a workpiece material, workpiece length, and workpiece radius corresponding to each workpiece number from the workpiece information SB. The deciding unit 11 reads a tool kind, workable step kind, tool length, tool radius and workable workpiece material corresponding to each combination of a system number and an in-system tool number from the tool information SC. The deciding unit 11 reads a workpiece number corresponding to each machining step number from the machining step corresponding workpiece information SD.

In step S103, one machining step is selected from the machining step information SA. For example, if the machining step number "1" is selected, the machining step kind is "drilling", the machining radius is "5", and the machining depth is "10". In step S104, one system is selected from the tool information SC. For example, if the system number "1" is selected, there are two kinds of tools, which have the in-system tool numbers "1" and "2".

In step S105, one tool is chosen among plural tools in the selected system number. For example, the in-system tool number "1" is selected. In step S106, it is decided whether or not the workable workpiece material of the tool of the selected in-system tool number includes the workpiece material used in the selected machining step. At this time, such workpiece material is determined beforehand by use of the workpiece information SB which connects the workpiece material with the workpiece number and the machining step corresponding workpiece information SD which connects the workpiece number with the machining step number. If it includes the workpiece material decided by the workpiece information SB and the machining step corresponding workpiece information SD, the execution proceeds to step S111. If it does not include any such workpiece material, the execution proceeds to step S107, and it is decided if there is another tool in the same system or not. If there is no other tool, the execution proceeds to step S109, and it is decided if there is another system in the tool information SC or not. If there is another system, the next system is selected from the tool information SC and the execution returns to step S105. If there is another tool in step S107, another tool is selected in step S108 and the execution returns to step S106.

If there is no other system in step S109, the execution proceeds to step S116 and it is determined if there is another machining step in the machining step information SA or not. If there is another machining step left, the next machining step is selected in step S117 and the execution proceeds to step S104. On the other hand, if there is no other machining step left, the routine is ended.

In step S111, it is decided if the workable step kind of the selected tool includes the machining step kind selected from the machining step information SA or not. If it includes the machining step kind selected from the machining step information SA, the execution proceeds to step S112. If it does not include such a machining step kind, the execution returns to step S107.

In step S112, it is decided if the machining step kind is "drilling" or not. For example, if it is "drilling" as in the case of the machining step number "1", the execution proceeds to step S113. Then, it is decided if the machining radius of the machining step information SA is the same as the machining radius of the tool information SC or not. For example, the machining radius of the machining step number "1" is "5", while the tool radius of the drill is "5" in the in-system tool number "1" of the system number "1". Thus, they are equal, so that the execution proceeds to step S114. If they are not equal, the execution returns to step S107. If the machining step kind is not "drilling", the execution proceeds to step S118.

In step S114, it is decided whether or not the machining depth of the machining step information SA is smaller than the double of the workpiece radius (diameter of the workpiece) of the workpiece number which corresponds to the machining step number in the machining step corresponding workpiece information SD. For example, in case of the machining step number "1", the machining depth is "5", while the workpiece number is "1" and the workpiece radius of the workpiece number "1" is "40". Therefore, the machining depth is smaller than the double of the radius of the workpiece and the execution proceeds to step S115. On the other hand, if the machining depth is not smaller than the double of the workpiece radius, the execution returns to step S107.

In step S115, the deciding unit 11 writes a circle mark "0" in the "Workability" column corresponding to the selected machining step number and the selected system number in the workable system and workpiece information SE, since it can handle the machining step of the selected machining step number. It also writes the selected tool number in the "Tool No." column and the workpiece number in the "Workpiece No." column for the selected machining step number. For example, in case of the machining step number "1" to which the system number "1" and the in-system tool number "1" are allocated, the deciding unit 11 writes the circle mark "0" in the workability column, "1" in the tool number column and "1" in the workpiece number column. Then, the execution returns to step S107, and the same decision is carried out for the other tools in the same system. Thus, data are written in corresponding columns of the workable system and workpiece information SE.

For example, when performing "drilling" of the machining step number "1", there are two kinds of tools available for "drilling" as the workable step kind in the tool information SC. Namely, the in-system tool numbers "1" and "2" of the system number "2" are available. Here, the workable workpiece material of the in-system tool number "2" is "carbon steel" and equal to the material of the workpiece number "1" of the workpiece information SB, which becomes the workpiece of the machining step number "1". Therefore, the deciding unit 11 writes the circle mark "0" in the workability column and "2" in the tool number column of the system number "2" of the workable system and workpiece information SE.

In step S118, it is decided if the machining step kind of the selected machining step is "cutting-off" or not. If the machining step kind is "cutting-off", the execution proceeds to step S119. Then, it is decided whether or not the workpiece radius known from the workpiece information SB is smaller than the tool length known from the tool information SC. If the workpiece radius is smaller than the tool length, the execution returns to step S115. Then, the deciding unit 11 writes the circle mark "0" in the "Workability" column corresponding to the selected machining step number and the selected system number in the workable system and workpiece information SE, as in the case of "drilling" mentioned before. Similarly, it writes the tool number in the "Tool No." column and the workpiece number in the "Workpiece No." column for the selected machining step number.

For example, in case of the machining step number "2", the workpiece number "2" is called from the machining step corresponding workpiece information SE. Then, the deciding unit 11 is informed that the workpiece radius is "30" from the workpiece information SB.

Moreover, the deciding unit 11 is informed that the workable step kind of the in-system tool number "2" in the system number "1" is "cutting-off" and that the tool length is "100" and larger than the workpiece radius "30". Accordingly, with respect to the machining step number 2, the deciding unit 11 writes the circle mark "0" in the "Workability" column and "2" in the "Tool No." column of the system number "1" in the workable system and workpiece information SE. It also writes "2" in the "Workpiece No." column in the information SE. The same decision is performed for the in-system tool numbers "1", "2" and "3" of the system number "2", respectively. The result is written in the information SE. In this example, there is no "cutting-off" in the workable step kind of each tool of the system number "2". As a result, with respect to the machining step number "2", the deciding unit 11 writes a cross mark "X" in the "Workability" column and a dash mark "-" in the "Tool No." column of the system number "2".

If the machining step kind is not "cutting-off" in step S118, the execution proceeds to step S120, and it is decided if the machining step kind is "grooving" or not. If it is "grooving", the execution proceeds to step S121. In step S121, it is decided if the tool length in the tool information SC is longer than the machining depth in the machining step information SA or not. If it is not larger, the execution returns to step S107. If larger, the the deciding unit 11 writes the circle mark "0" in the "Workability" column corresponding to the selected machining step number and the selected system number in the workable system and workpiece information SE, as in the case of "drilling" or "cutting-off" mentioned before. Similarly, it writes the tool number in the "Tool No." column and the workpiece number in the "Workpiece No." column for the selected machining step number.

For example, in case of the machining step number "3", the workpiece number "1" is called from the machining step corresponding workpiece information SD. Moreover, the deciding unit 11 is informed that the machining depth is "20" from the machining step information SA.

Furthermore, the deciding unit 11 is informed that there is no "grooving" as the workable step kind in the in-system tool number of the system number "1" from the tool information SC. On the other hand, the deciding unit 11 is informed that the workable step kind of the in-system tool number "3" in the system number "2" is grooving. Then, the deciding unit 11 is informed that the tool length is "80" and larger than the machining depth "20". Accordingly, with respect to the machining step number "3", the deciding unit 11 writes the cross mark "X" in the "Workability" column and dash mark "-" in the "Tool No." column of the system number "1" in the workable system and workpiece information SE. It also writes "1" in the "Workpiece No." column of the information SE. At the same time, the deciding unit 11 writes the circle mark "0" in the "Workability" column and "3" in the "Tool No." column of the system number "2" in the information SE.

As described above, the workable system deciding unit 11 generates the workable system and workpiece information SE which relates a workable system, tool number and workpiece number to each machining step.

Figure 12:
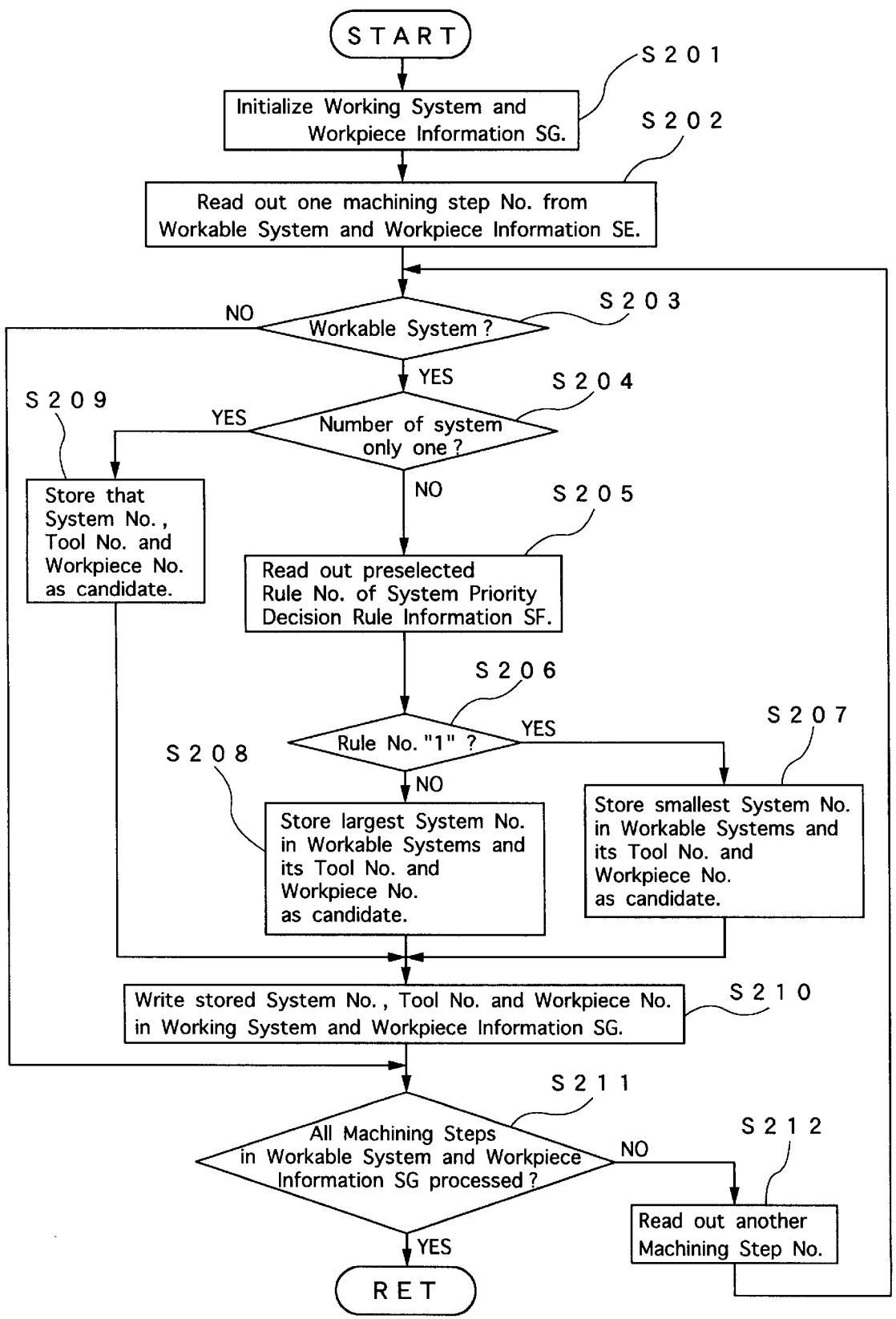
FIG. 12 is a flowchart showing an operation of a working system assigning unit according to the first embodiment of the invention.

An operation of the machining system assigning unit 12 is described hereafter referring to the flowchart shown in FIG. 12.

First of all, in step S201, the machining system and workpiece information SG is initialized. Namely, the assigning unit 12 writes zero "0" in the machining system number column, tool number column and workpiece number column of the machining system and workpiece information SG, at the machining step numbers corresponding to all the machining step numbers in the workable system and workpiece information SE.

In step S202, the assigning unit 12 reads out one machining step number from the workable system and workpiece information SE. At the same time, the assigning unit 12 reads out the workability and the tool number of each system for the read-out machining step number from the information SE. It also reads out the workpiece number for the read-out machining step number therefrom. In step S203, it is decided if there is at least one workable system or not. If there is no workable system, the execution proceeds to step S211 described later. If there are one or more workable systems, it is decided if the number of the workable system is only one or not. If there is only one workable system, its system number and tool number and the workpiece number are stored as candidates in step S209.

If there are two or more systems in step S204, the assigning unit 12 reads out the rule number of the system priority decision rule SF in step S205. Then, it is decided if the rule number is "1" or not in step S206. If the rule number is not "1", the largest system number among the workable systems and its tool number and the workpiece number are stored as candidates in step S208. If the rule number is "1", the smallest system number among the workable systems and its tool number and the workpiece number are stored as candidates in step S207. In step S210, the assigning unit 12 writes the stored candidates of the workable system number and tool number and the workpiece number in the machining system and workpiece information SG. In step S211, it is decided whether or not all the machining step numbers were processed in the workable system and workpiece information SE. If not, another machining step number is read out in step S212 and the execution returns to step S203. On the other hand, if all the machining step numbers were processed, the routine is ended.

As described above, the machining system assigning unit 12 generates the machining system and workpiece information SG that connects the machining system number and its tool number and the workpiece number to the machining step number one to one.

Figure 13:
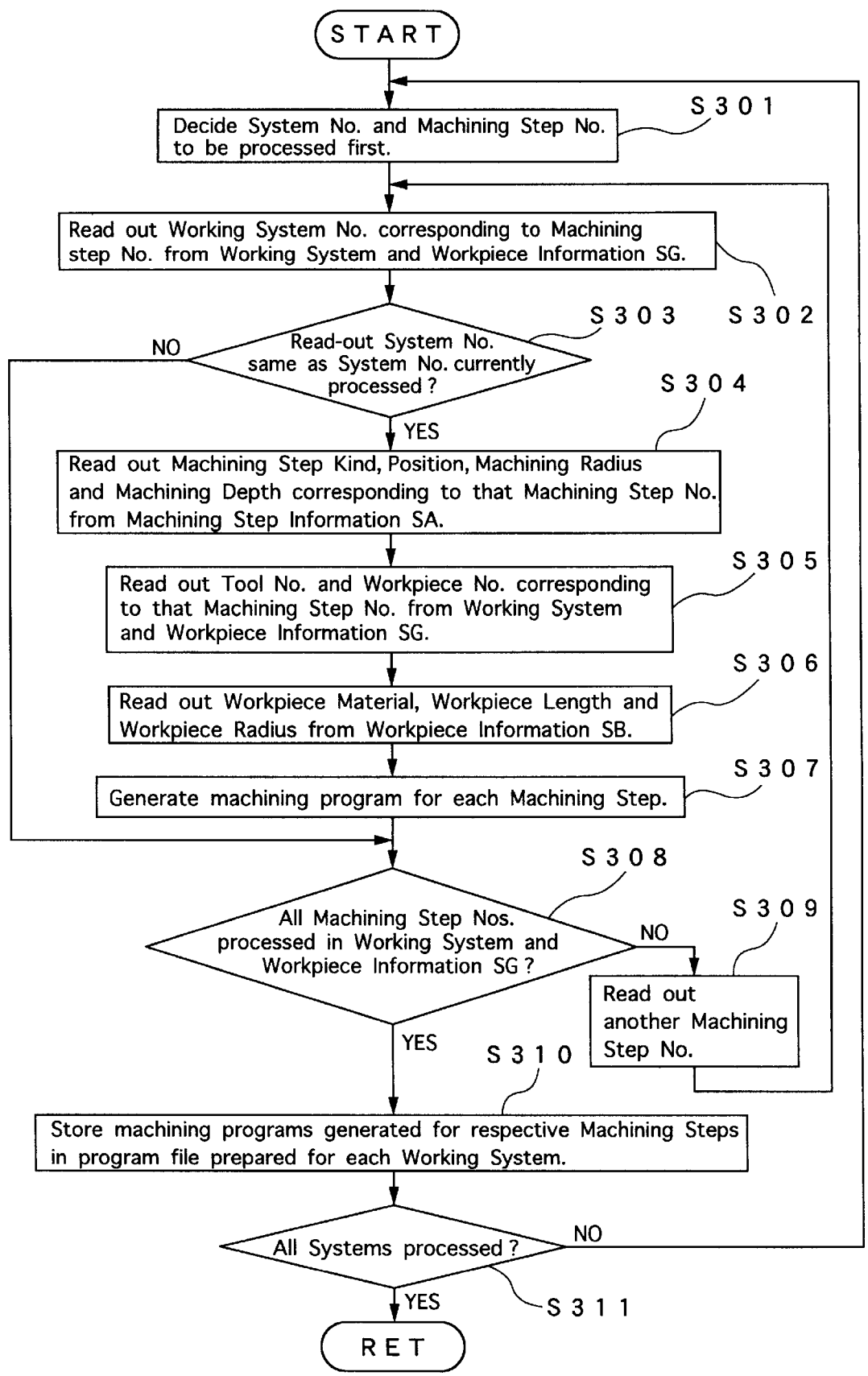
FIG. 13 is a flowchart showing an operation of a machining program control unit according to the first embodiment of the invention.

An operation of the machining program control unit 2 for generating a machining program for each system is described hereafter referring to a flowchart of FIG. 13.

In step S301, the program control unit 2 determines a system number and a machining step number to be processed first. In step S302, the control unit 2 reads out a working system number corresponding to one machining step number. In step S303, it is decided whether or not the read-out working system number is the same as the system number currently processed. If not, the execution proceeds to step S308. If the same, the control unit 2 reads out the machining step kind, position, machining radius and machining depth corresponding to that machining step number from the machining step information SA.

In step S305, the tool number and workpiece number corresponding to the machining step number are read out from the working system and workpiece information SG. In step S306, the workpiece material, workpiece length and workpiece radius corresponding to the workpiece number are read out from the workpiece information SB. In step S307, a machining program is generated for the read-out machining step as a machining step program.

For instance, FIG. 14 shows an example of a program for "drilling" of the machining step number "1" to which the working system number "1" is allocated. With this program, a cylindrical workpiece of a radius "40" chucked on a lathe has its outer peripheral surface bored with a hole of a depth "10" at a position of "100" in the Z-direction from an origin. On the other hand, FIG. 15 shows an example of a program for "cutting-off" of the machining step number "2" to which the working system number "1" is allocated. With this program, a cylindrical workpiece of a radius "40" chucked on a lathe is cut off at a position of "400" in the Z-direction from an origin.

In step S308, it is decided whether or not all the machining step numbers were processed in the working system and workpiece information SG. If not, another machining step number is read out in step S309, and the execution returns to step S302, thereby repeating the routine from step S302. On the other hand, if the processing was completed for all the machining step numbers, the execution proceeds to step S31. Then, a plurality of machining programs generated for respective machining steps are stored in a program file prepared for each system. Namely, the machining programs for plural machining steps contained in the same working system number are collected in one group.

For example, in case of the working system and workpiece information SG of FIG. 8, the machining steps "1" and "2" are contained in the working system number "1". Then, the machining program for the machining step number "1" shown in FIG. 14 and the machining program for the machining step number "2" shown in FIG. 15 are gathered as a machining program of the working system number "12, as shown in FIG. 16.

As mentioned above, according to the present embodiment, the programming device or method decides the workable system and workpiece information SE in step S115, for example. Moreover, it decides the working system and workpiece information SG in step S210, for example. In addition , it determines the tool number and the workpiece number when deciding the workable system and workpiece information SE. Therefore, even an unskilled operator can easily decide the conditions such as a tool or workpiece necessary for preparing the machining programs for respective working systems. Namely, the device is able to determine the information required for generating a machining program for each machining system. Thus, the machining program can be automatically generated for each system.

Moreover, the machining program for each working system is generated automatically by use of the informations SA, SB and SG, without any work of the operator needed.

In conclusion, it can be automatically decided which machining step should be processed with which machining system. Therefore, it automatically and easily decides the relation of the machining step and the machining system, which an operator considers and decides by himself or herself conventionally. Moreover, it is possible to prevent careless errors. Namely, it is possible to lighten the burden on the operator. Even an unskilled operator can easily prepare multi-system machining programs.

SECOND EMBODIMENT

A second embodiment of the invention is described referring to FIGS. 17–30. The second embodiment is used in combination with the first embodiment. Therefore, only the function added to that of the first embodiment is described hereafter to avoid redundancy.

Figure 17:
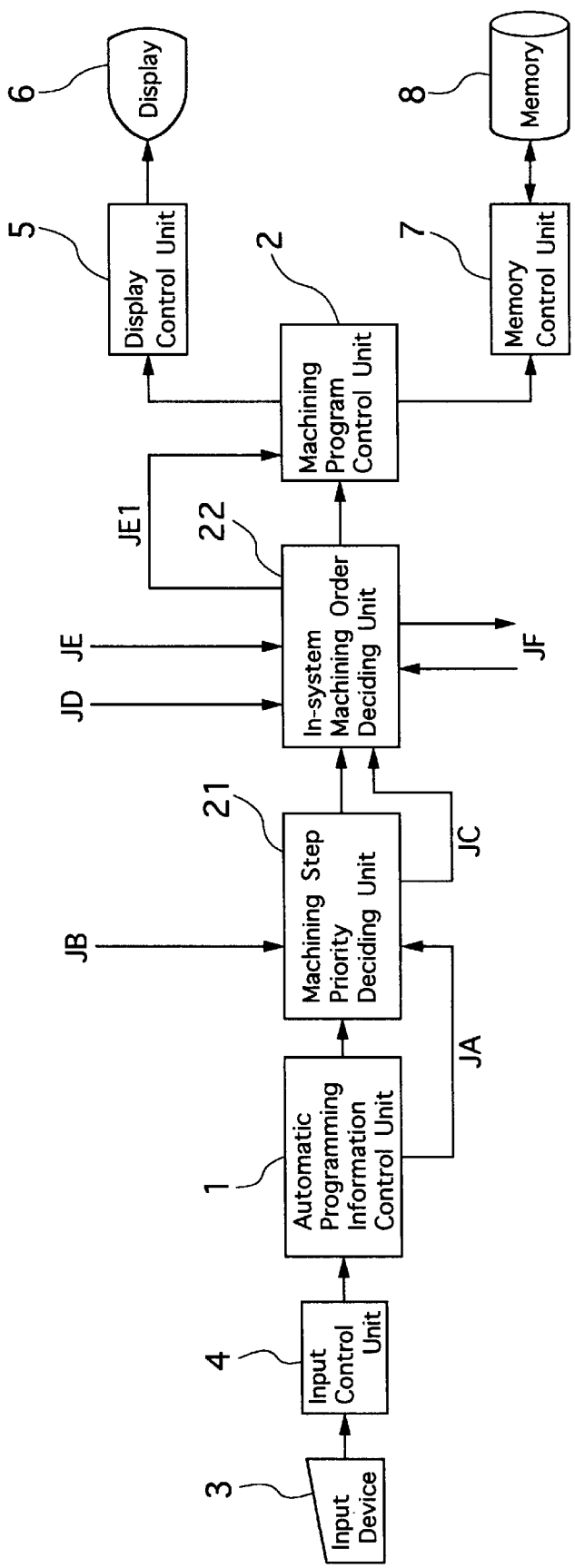
FIG. 17 is a block diagram showing an automatic programming device for multi-system machine tool according to a second embodiment of the invention.

FIG. 17 shows a block diagram of an automatic programming device according to this embodiment. A machining step priority order deciding unit 21 outputs a machining step priority order information JC on the basis of a machining step information JA and a machining step priority order rule information JB. An in-system machining order deciding unit 22 outputs an in-system machining order information JF on the basis of the machining step priority order information JC, a machining order rule information JD for the same priority order machining steps, and a working system information JE. Moreover, the machining order deciding unit 22 outputs a working system information JE1which has a machining order changed on the basis of an in-system machining order information JF1.

FIG. 18 shows an example of the machining step information JA. The machining step information JA is constituted by a machining step number and a machining step kind. The machining step information JA stores data about each machining step in case of machining one workpiece with one or more machining steps.

FIG. 19 shows an example of the machining step priority order rule information JB. The machining step priority order rule information B stores data about a priority order among machining steps which represents a machining order therefor. The information JB is constituted by a machining step kind and priority order. For example, FIG. 19 shows that the machining of the machining step kind A cannot be started until the machinings of the machining step kinds B and C are finished.

FIG. 20 shows an example of the machining step priority order information JC. The priority order information JC stores a priority order for each machining step which belongs to one system. The information JC is constituted by a machining step number and priority order. In this information JC, different machining steps may have the same priority order. For example, in FIG. 20, the machining step numbers "1" and "5" have the same priority order "2".

FIG. 21 shows an example of the working system information JE. The working system information JE stores data about which system should perform which machining step. The information JE is constituted by a machining step number and working system number.

FIG. 22 shows an example of the machining order rule information JD for the same priority order machining steps. The machining order rule information JD stores rules for deciding a machining order in case there are plural machining steps having the same priority order. The information JD is constituted by a rule number and rule. For example, the rule of the rule number "1" is that "the smallest machining step number of machining step has priority". The rule of the rule number "2" is that "the largest machining step number of machining step has priority". Otherwise, it is possible to prepare a rule that prefers an easier machining step, a machining step for drilling a smaller hole or vice versa, etc. It is selected beforehand which rule should be taken among the above rules.

FIG. 23 shows an example of the in-system machining order information JF. The in-system machining order information JF is constituted by a machining step number and machining order. In this information JF, the machining order is definitely decided. For example, in FIG. 23, the rule "1" of the machining order rule information JD is adopted, and the machining step of the smallest step number has more priority. Namely, the step number "2" is preferred than the step number "3", though they have the same priority order. Thus, it is impossible that different machining steps take the same turn in the machining order in the same system.

An operation of the automatic programming device is described hereafter, according to the second embodiment.

Figure 24:
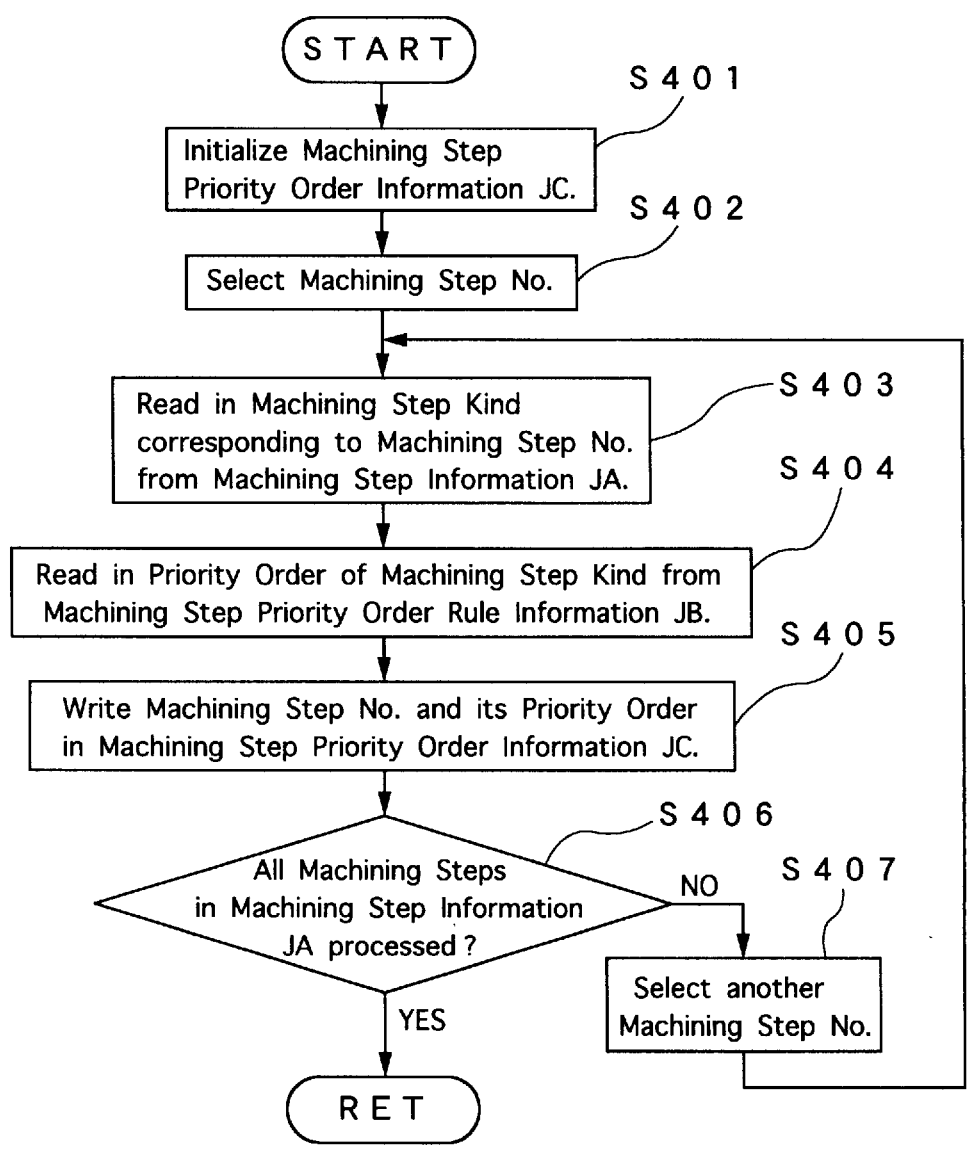
FIG. 24 is a flowchart showing an operation of a machining step priority order deciding unit according to the second embodiment of the invention.

FIG. 24 shows the operation of the machining step priority order deciding unit 21. In step S401, the machining step priority order information JC is initialized. In step S402, one machining step number is selected from the machining step information JA. In step S403, the deciding unit 21 reads in a machining step kind, from the machining step information JA, corresponding to the selected machining step number. For example, the machining step number "1" has the machining step kind "A", and the machining step number "2" has the machining step kind "B".

In step S404, a priority order of the selected machining step kind is read out from the machining step priority order rule information JB. In step S405, the priority order deciding unit 21 writes the machining step number and the priority order corresponding thereto in the machining step priority order information JC. In step S406, it is decided whether or not all the machining step numbers were processed in the machining step information JA. If not, another machining step number is selected in step S407, and the execution returns to step S403. On the other hand, if all the step numbers were processed, the routine is ended. Thus, the relation between the machining step number and the priority order is definitely decided.

An operation of the in-system machining order deciding unit 22 is described hereafter.

Figure 25:
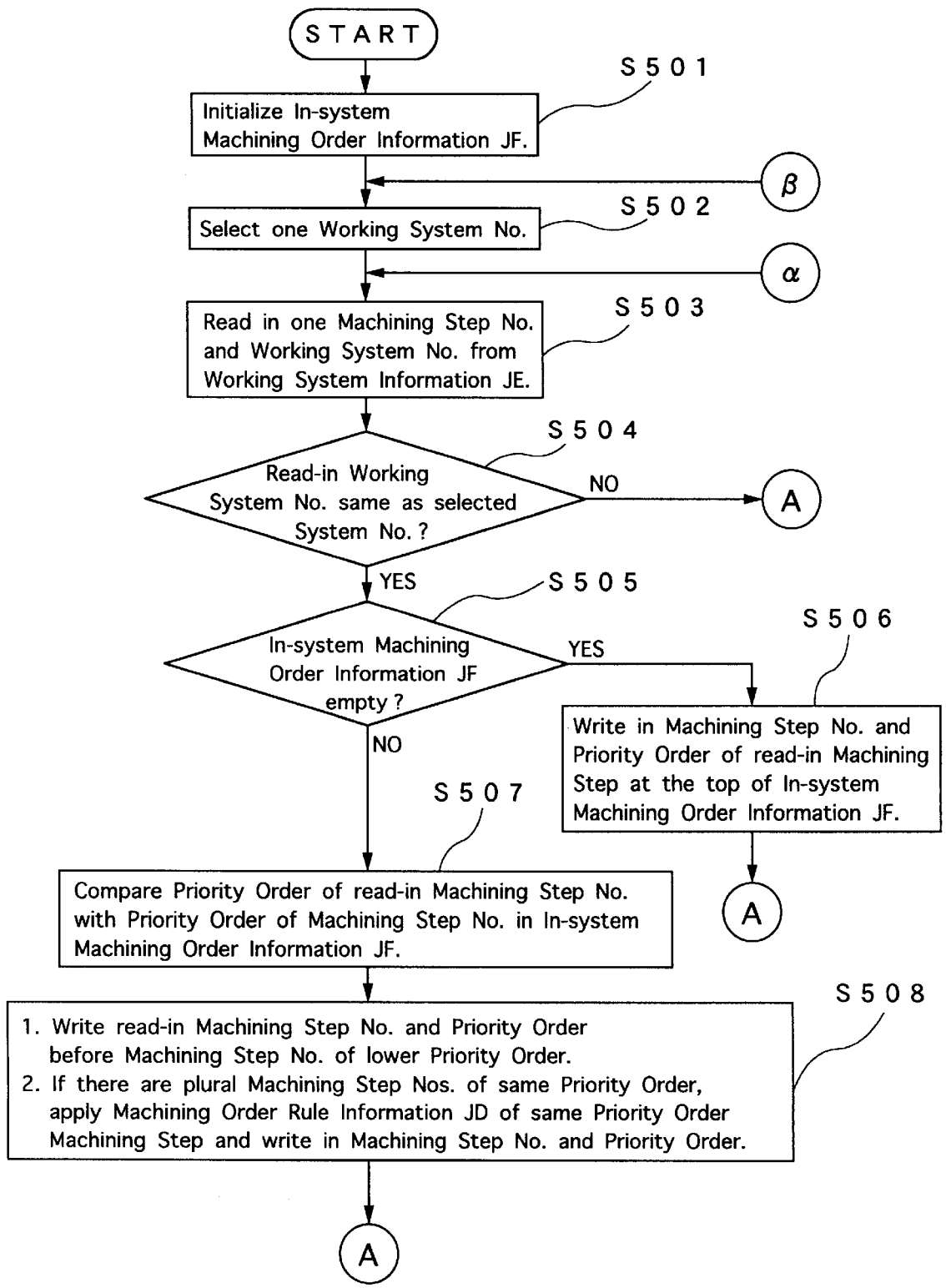
FIG. 25 and FIG. 26 are flowcharts showing an operation of an in-system machining order deciding unit according to the second embodiment of the invention.
Figure 26:
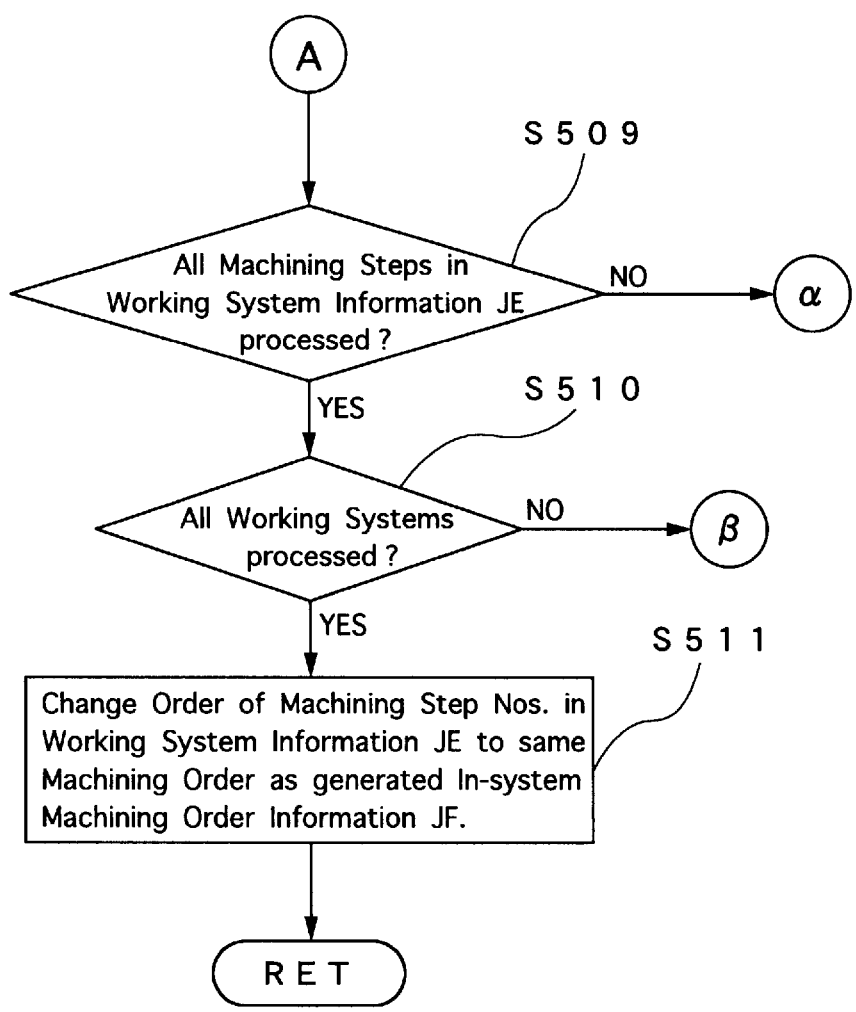

FIGS. 25 and 26 show the operation of the in-system machining order deciding unit 22. In step S501, the in-system machining order information JF is cleared for initialization. In step S502, the machining order deciding unit 22 selects one working system number in the working system information JE. In step S503, one machining step number and its working system number are read in from the working system information JE. In step S504, it is decided whether or not the read-in working system number is the same as the currently selected working system number. If not, the execution proceeds to step S509 described later. If the same, it is decided if the in-system machining order information JF is empty or not in step S505. If empty, the deciding unit 22 writes in the read-in machining step number and its priority order at the top of the information JF in step S506. On the other hand, if not empty, the deciding unit 22 compares the priority order of the read-in machining step number with the priority order of the machining step numbers already set in the in-system machining order information JF.

In step S508, the deciding unit 22 writes the read-in machining step number and priority order in front of a machining step number which has a lower priority order than the priority order of the read-in machining step number. If there are plural machining step numbers of the same priority order, one of the rules of the machining order rule information JD shown in FIG. 22 is adopted. Then, the read-in machining step number and priority order are written in a predetermined position in the in-system machining order information JF.

For example, where the working system number "1" and the machining step number "1" are selected from the machining system information JE of FIG. 21, the data in the in-system machining order information JF is formed by referring to the machining step information JA of FIG. 18 and the machining step priority order rule information JB of FIG. 19, thereby becoming an information JF1 shown in FIG. 27. Next, if the machining step number "2" is selected from the machining system information JE, the working system number thereof is "1" and the same as the present one. Then, the priority order of the machining step number "2" is compared with the priority order of the machining step number "1" in the in-system machining order information JF1 of FIG. 27. Since the machining step kind of the machining step number "1" is "A" and the machining step kind of the machining step number "2" is "B", the priority order of the machining step number "2" is higher than the priority order of the machining step number "1" by referring to the machining step priority order rule information JB. Therefore, the machining step number "2" of the higher priority order is written in front of the machining step number "1". The resulting in-system machining order information JF2 is shown in FIG. 28.

Moreover, if the machining step number "3" is selected from the machining system information JE, the machining system number thereof is "1" and the same as the present one. Then, the priority order of the machining step number "3" is compared with the priority order of the machining step numbers "1" and "2" already set in the in-system machining order information JF2 of FIG. 28. Since the machining step kind of the machining step number "3" is "C" from the machining step information JA, the priority order of the machining step number "3" is "1" by referring to the machining step priority rule information JB. Namely, it is preferred to the priority order of the machining step number "1" but the same as the priority order of the machining step number "2". Therefore, it is necessary to further determine the rank of the priority orders between the machining step numbers "2" and "3" by use of the rules of the machining order rule information JD. At this time, provided that the rule number "1" is adopted, the machining step number "2" is preferred than the machining step number "3" in machining. Therefore, the machining step number "3" is written after the machining step number "2". The resulting in-system machining order information JF3 is shown in FIG. 29. Namely, the in-system machining order information JF is produced as mentioned above.

In step S509, it is decided if all the machining step numbers in the working system information JE were processed or not. If not, the execution returns to step S503. On the other hand, if all the machining step numbers were processed, the execution proceeds to step S510, and it is decided if all the working systems were processed or not. If not, the execution returns to step S502. If all systems were processed, the execution proceeds to step S511, and the order of the machining step numbers in the working system information JE is changed in the same order as that of the prepared in-system machining order information JF. Thus, the machining system information JE1 is generated as shown in FIG. 30. In this working system information JE1, the machining step numbers "4" and "5" were processed in the same manner as the machining step numbers "1"–"3".

As mentioned above, the machining order is changed from the order of the machining step information JE to the machining order of the machining step information JE1. Thus, the machining step numbers and the working system numbers are stored in the working system information JE1 in such an order as the a series of machinings should be carried out. Thereafter, the machining program control unit 2 can automatically generate a machining program for each machining step and a machining program for each working system, on the basis of the data in the machining system information JE1. This is done with the same operation as the operation shown by the flowchart in FIG. 13 as described in the first embodiment.

As described above, the programming device or method according to the second embodiment decides the machining order between plural machining steps belonging to the same working system on the basis of the informations JB and JD in step S508, for example. Therefore, even an unskilled operator can easily decide the machining order in the same working system.

Moreover, it generates a new machining program constituted by the working system information JE1 which has a machining order changed, on the basis of the informations JE and JF. Therefore, if there arise inconveniences in the machining order in each working system, a new machining program can be generated or renewed for each working system without any manual work of the operator.

Thus, it is possible to automatically determine a machining order of plural machining steps in the same working system, thereby generating a machining program for each system. Accordingly, the operator can input information about machining steps disregarding an actual machining order. Namely, the operator is free from such a difficult work conventionally required, so that the burden on the operator is very much lightened. Moreover, the inventive device is able to automatically decide the best machining order as the skilled operator does, by supplying substantial data to the machining step priority order rule information JB and the machining order rule information JD.

THIRD EMBODIMENT

A third embodiment of the invention is described referring to FIGS. 31 to 66.

Figure 31:
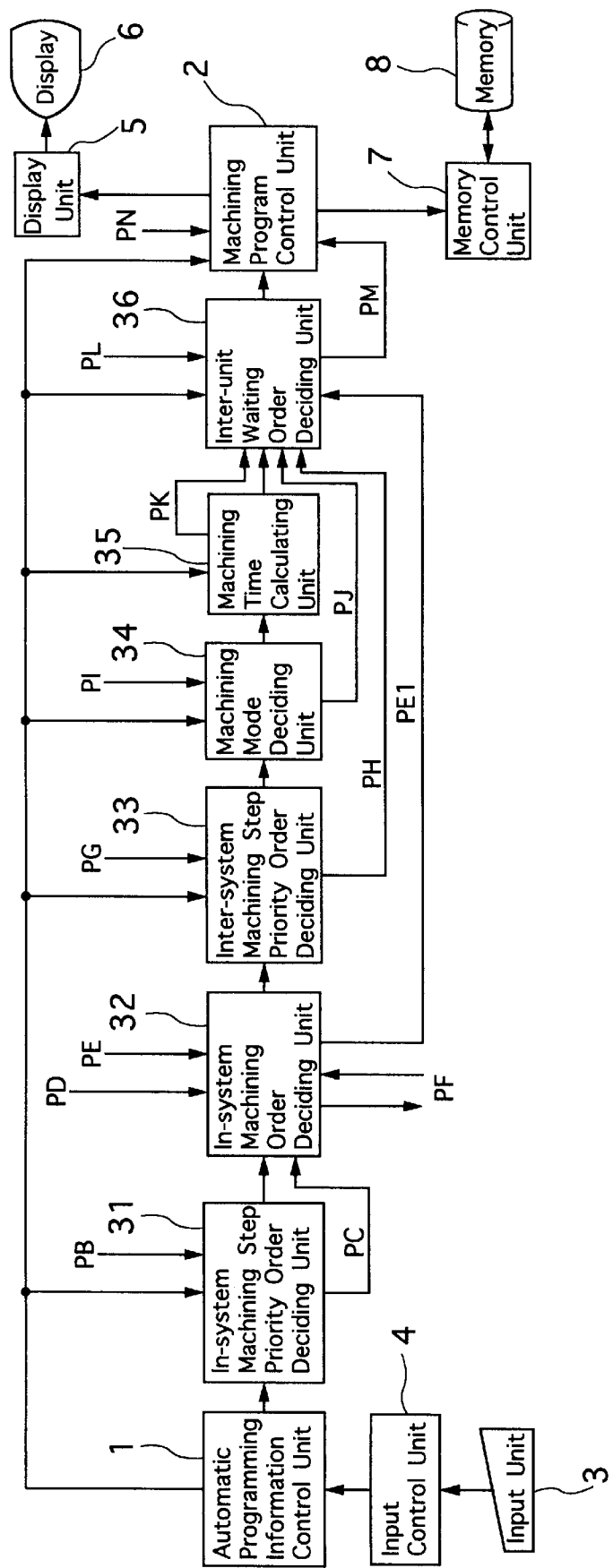
FIG. 31 is a block diagram showing an automatic programming device for multi-system machine tool according to a third embodiment of the invention.

FIG. 31 shows an automatic programming device for multi-system machine tool according to the third embodiment of the invention. In FIG. 31, an in-system machining step priority order deciding unit 31 outputs an in-system machining step priority order information PC on the basis of a machining step information PA and an in-system machining step priority order rule information PB. An in-system machining order deciding unit 32 outputs an in-system machining order information PF on the basis of the in-system machining step priority order information PC, a machining order rule information PD for machining steps which have an equal priority order in the same system, and a working system information PE. The machining order deciding unit 32 also outputs a working system information PE1 with a machining order changed on the basis of the in-system machining order information PF. An inter-system machining step priority order deciding unit 33 outputs an inter-system machining step priority order information PH on the basis of the machining step information PA and an inter-system machining step priority order rule information PG. A machining mode deciding unit 34 outputs a machining mode information PG on the basis of the machining step information PA and a machining mode rule information PI. A machining time calculating unit 35 outputs a machining time information PK on the basis of the machining step information PA. An inter-system waiting order deciding unit 36 outputs a machining step waiting order information PM on the basis of the machining step information PA, working system information PE1, inter-system priority order information PH, machining mode information PJ, machining time information PK and machining order rule information PL.

FIG. 32 shows an example of the machining step information PA. The machining step information PA stores data concerning each machining step in case of machining one workpiece with one or more machining steps. The information PA is constituted by a machining step number, machining step kind, machining speed, start position, end position and machining depth. The machining depth represents a distance from a rotational center of the workpiece.

FIG. 33 shows an example of the in-system machining step priority order rule information PB. The in-system priority order rule information PB stores data concerning a priority order in which the machining steps are processed in the same system. This information PB is constituted by a machining step kind and in-system priority order. For example, the illustrated data shows that the machining step kind "drilling" cannot be performed until the machining step kinds "rough lathe turning" and "grooving" are finished processing.

FIG. 34 shows an example of the in-system machining step priority order information PC. The in-system priority order information PC stores a priority order for each of the machining steps treated in the same system. The information PC is constituted by a machining step kind and in-system priority order. In some cases, different machining steps have an equal priority order in the information PC. For example, the illustrated data shows that all the machining step numbers "1", "2" and "3" have an in-system priority order of "3".

FIG. 35 shows an example of the working system information PE. This information PE stores data concerning which system should perform machining of which machining step. The information PE is constituted by a machining step number and working system number. It is set in advance which system should be in charge of which machining step.

FIG. 36 shows an example of the machining order rule information PD. The order rule information PD stores a rule for deciding a machining order in case there are plural machining steps having an equal in-system priority order in the same system. This information PD is constituted by a rule number and rule. For example, the rule number "1" is defined such that "priority is given to a machining step of a smallest machining step number". The rule number "2" is defined such that "priority is given to a machining step of a largest machining step number". Otherwise, it is possible to prepare a rule that prefers an easier machining step, a machining step for drilling a smaller hole or vice versa, etc. It is selected beforehand which rule should be taken among the above rules.

FIG. 37 shows an example of the in-system machining order information PF. The machining order information PF is constituted by a machining step number and in-system priority order. The machining process is carried out in turn in the order stored in this information PF. In this information PF, the machining order is definitely decided. Then, it is impossible that different machining steps take the same turn in the machining order in the same system.

FIG. 38 shows an example of the inter-system machining step priority order rule information PG. The inter-system priority order rule information PG store data concerning a priority order in which plural machining steps are processed between plural systems. This information PG is constituted by a machining step kind and inter-system priority order. For example, the illustrated table shows that the machining step kinds of "cutting-off", "drilling" and "grooving" cannot be processed until the machining step kind "rough lathe turning" is finished processing.

FIG. 39 shows an example of the inter-system machining step priority order information PH. The inter-system priority order information PH stores a priority order among the systems for each machining step. This information PH is constituted by a machining step number and inter-system priority order. It is possible that different machining steps have the same priority order in the information PH. For example, in the illustrated table, the machining step numbers "1", "2", "3", "4" and "6" have the same inter-system priority order "2". Only the machining step number "5" has another inter-system priority order "1".

FIG. 40 shows an example of the machining mode rule information PI. The machining mode rule information PI stores data concerning a machining mode corresponding to a machining step kind. This information PI is constituted by a machining step kind and machining mode. For example, the illustrated table shows that the processings of the machining step kinds "cutting-off" and "rough lathe turning" are performed while rotating the workpiece. On the other hand, the processings of the machining step kinds "drilling" and "grooving" are carried out while the workpiece is not rotated.

FIG. 41 shows an example of the machining mode information PJ. The machining mode information PJ stores data concerning a machining mode for each machining step. This information PJ is constituted by a machining step number and machining mode. For example, the illustrated table shows that the machining step numbers "1", "2", "3" and "4" have a machining mode in which they are processed while the workpiece is not rotated. On the other hand, the machining step numbers "5" and "6" have a machining mode in which they are processed while the workpiece is rotated.

FIG. 42 shows an example of the machining time information PK. The machining time information PK stores data concerning a machining time for each machining step. This information PK is constituted by a machining step number and machining time. For example, the illustrated table shows that the machining time of the machining step number "1" is 6 minutes, that the machining time of the machining step number "2" is 5 minutes and that the machining time of the machining step number "5" is 9 minutes.

FIG. 43 shows an example of the machining order rule information PL. The machining order rule information PL stores a rule for deciding a machining order in case there is a possibility that plural machining steps having an identical priority order are processed at the same time between plural systems. This information PL is constituted by a rule number and rule. For example, the rule number "1" is defined such that "priority is given to a machining step of a smallest machining step number". The rule number "2" is defined such that "priority is given to a machining step of a largest machining step number". Otherwise, it is possible to prepare a rule that prefers an easier machining step, a machining step for drilling a smaller hole or vice versa, etc. It is selected beforehand which rule should be taken among the above rules.

FIG. 44 shows an example of the machining step waiting order information PM. The waiting order information PM stores data concerning a waiting order between the machining steps. This information PM is constituted by a machining step number, working system number, pre-machining waiting number and post-machining waiting number. For example, the machining step of the machining step number "4" has a pre-machining waiting number "1", so that this step must wait until processing of machining steps of another system is completed. Moreover, the machining step of the number "4" has a post-machining waiting number "2" and makes other machining steps wait. The machining step of the machining step number "1" has no pre-machining waiting number, so that this machining step can start processing just after other machining steps in the same system are completed. Moreover, the machining step of the number "1" has no post-machining number, so that it makes no other machining steps of another system wait.

FIG. 45 shows an example of the workpiece information PN. The workpiece information PN stores data concerning a workpiece. This information PN is constituted by a workpiece number, workpiece length and workpiece radius. Both of the workpiece length and workpiece radius define a workpiece shape in this embodiment. For example, the illustrated table shows that the workpiece of the workpiece number "1" has a workpiece shape of a cylinder column and its length is "500" and its radius is "40".

An operation of the automatic programming device is described hereafter according to the third embodiment.

In the following description, a lathe having two machining systems is used as a machine tool, and a cylindrical workpiece is grasped by a chuck. The machinings exemplified hereunder are a lathe turning in which a tool is moved in an axial direction of the cylindrical workpiece, a machining in which the cylindrical workpiece is cut off, and a machining in which the cylindrical workpiece is not rotated but in which a tool is moved in a perpendicular direction to the axis thereof so as to bore it or groove it in the perpendicular direction to the axis.

Figure 46:
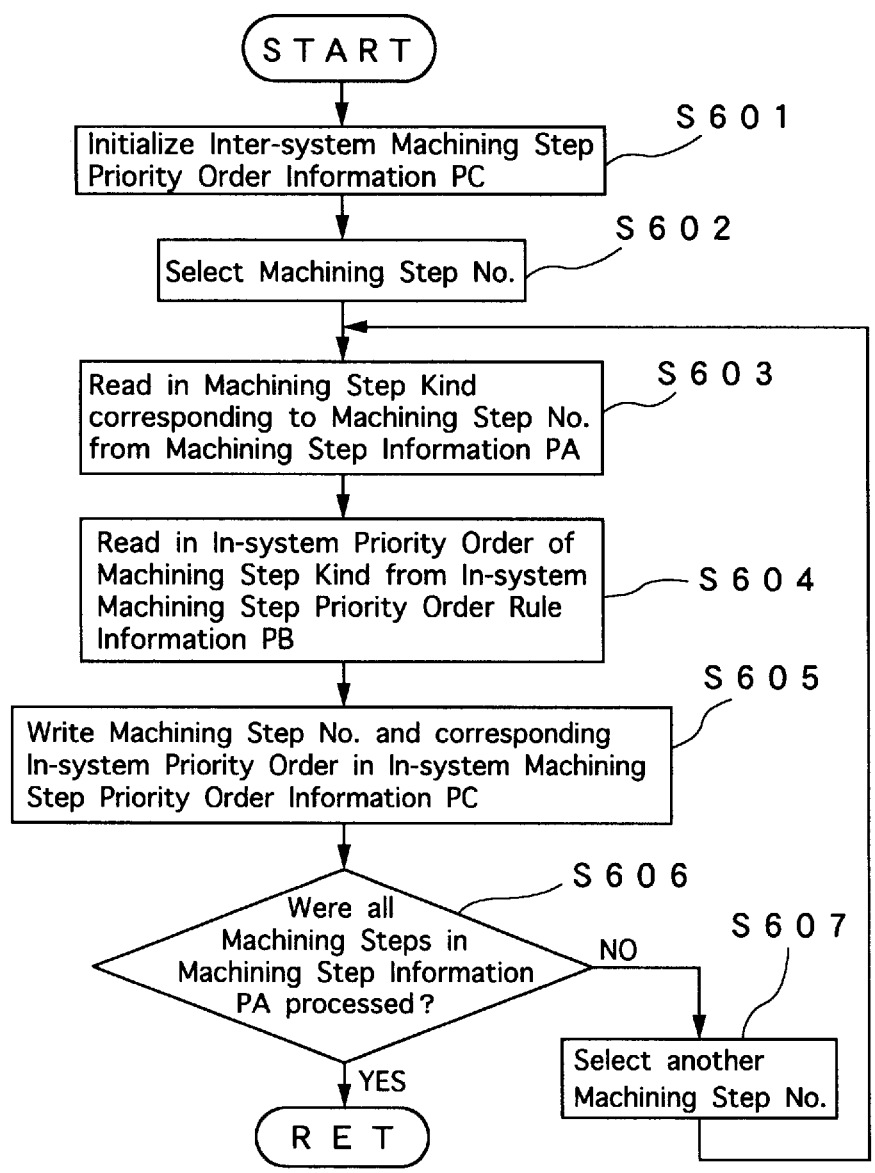
FIG. 46 is a flowchart showing an operation of an in-system machining step priority order deciding unit according to the third embodiment of the invention.

FIG. 46 shows an operation of the in-system machining step priority order deciding unit 31.

In step S601, the in-system machining step priority order information PC is initialized. In step S602, one machining step number is selected from the machining step information PA. In step S603, the deciding unit 31 reads in a machining step kind corresponding to the selected machining step number from the machining step information PA, For example, the machining step number "1" has the machining step kind "drilling", and the machining step number "1" has the machining step kind "grooving".

In step S604, the in-system priority order of the selected machining step kind is read out from the machining step priority order rule information PB. In step S605, the deciding unit 31 writes the machining step number and the in-system priority order corresponding thereto in the in-system machining step priority order information PC. In step S606, it is decided whether or not all the machining step numbers were processed in the machining step information PA. If not, another machining step number is selected in step S607, and the execution returns to step S603. On the other hand, if all the steps were processed, the routine is ended. Thus, the relation between the machining step number and the in-system priority order is definitely decided.

Figure 47:
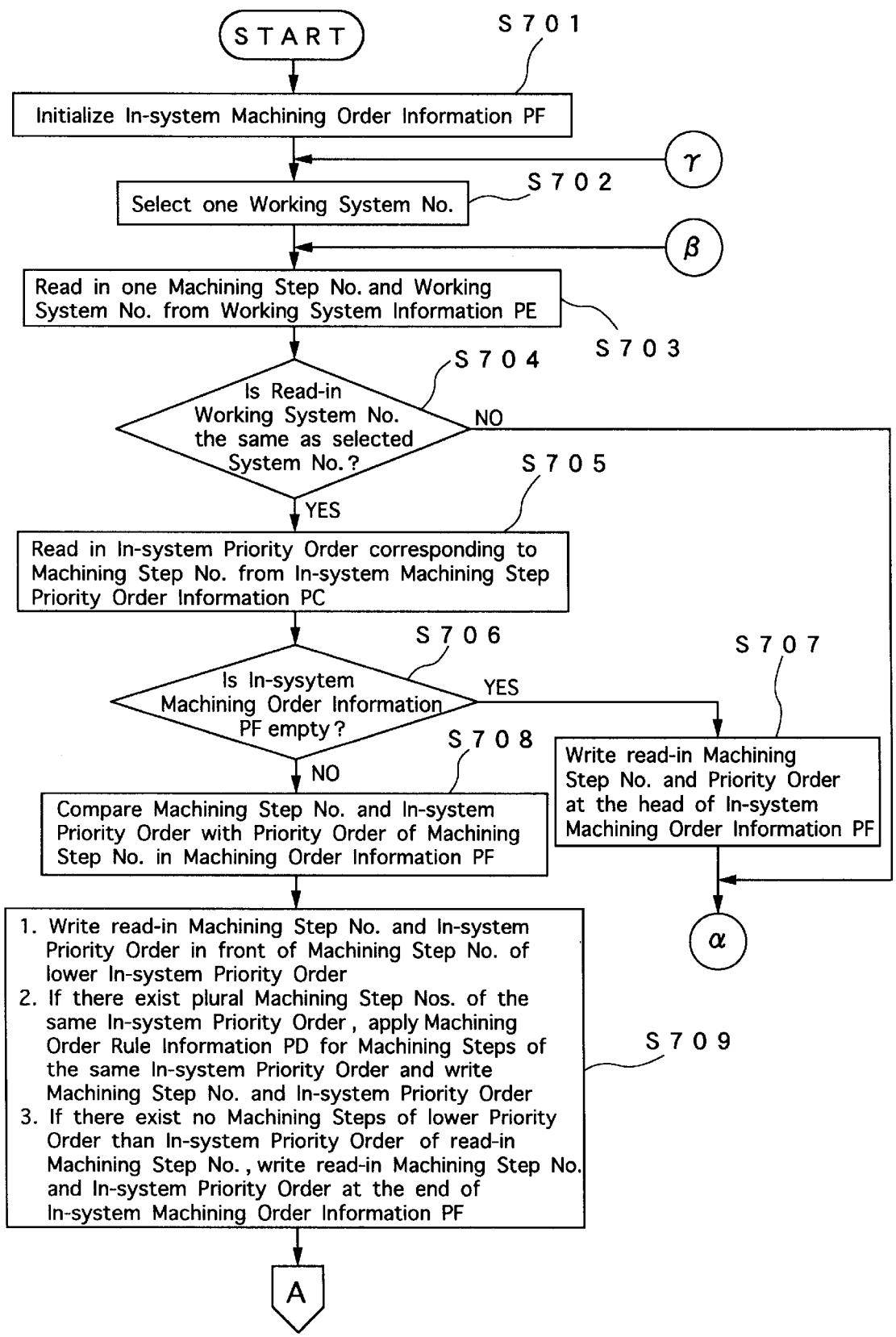
FIG. 47 and FIG. 48 are flowcharts showing an operation of an in-system machining order deciding unit according to the third embodiment of the invention.
Figures 48, 49:
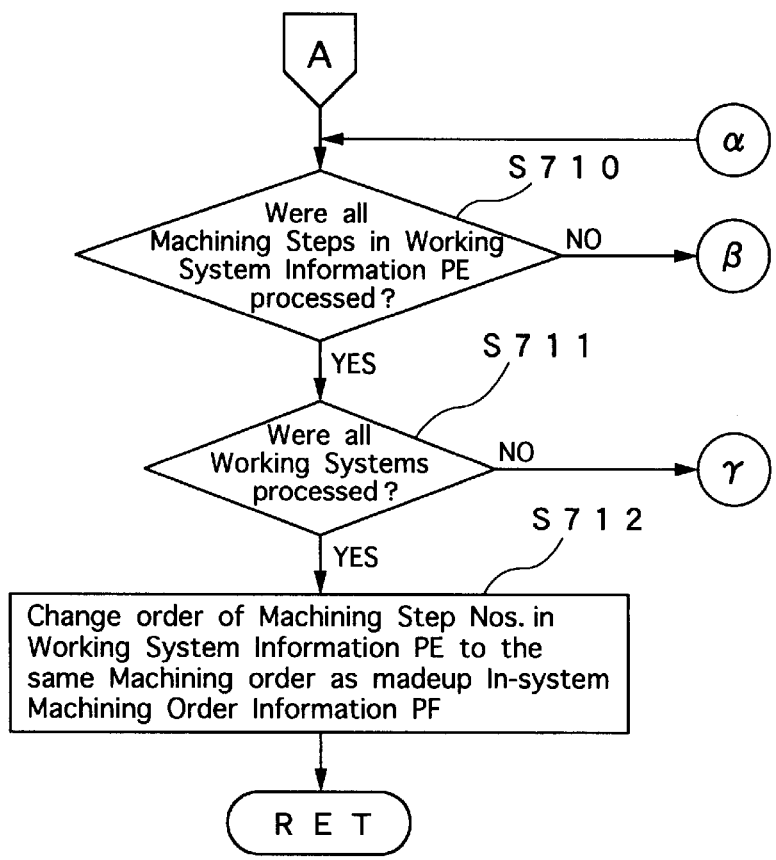
FIG. 49 is a table showing an example of an in-system machining order information according to the third embodiment of the invention.
Figure 53:
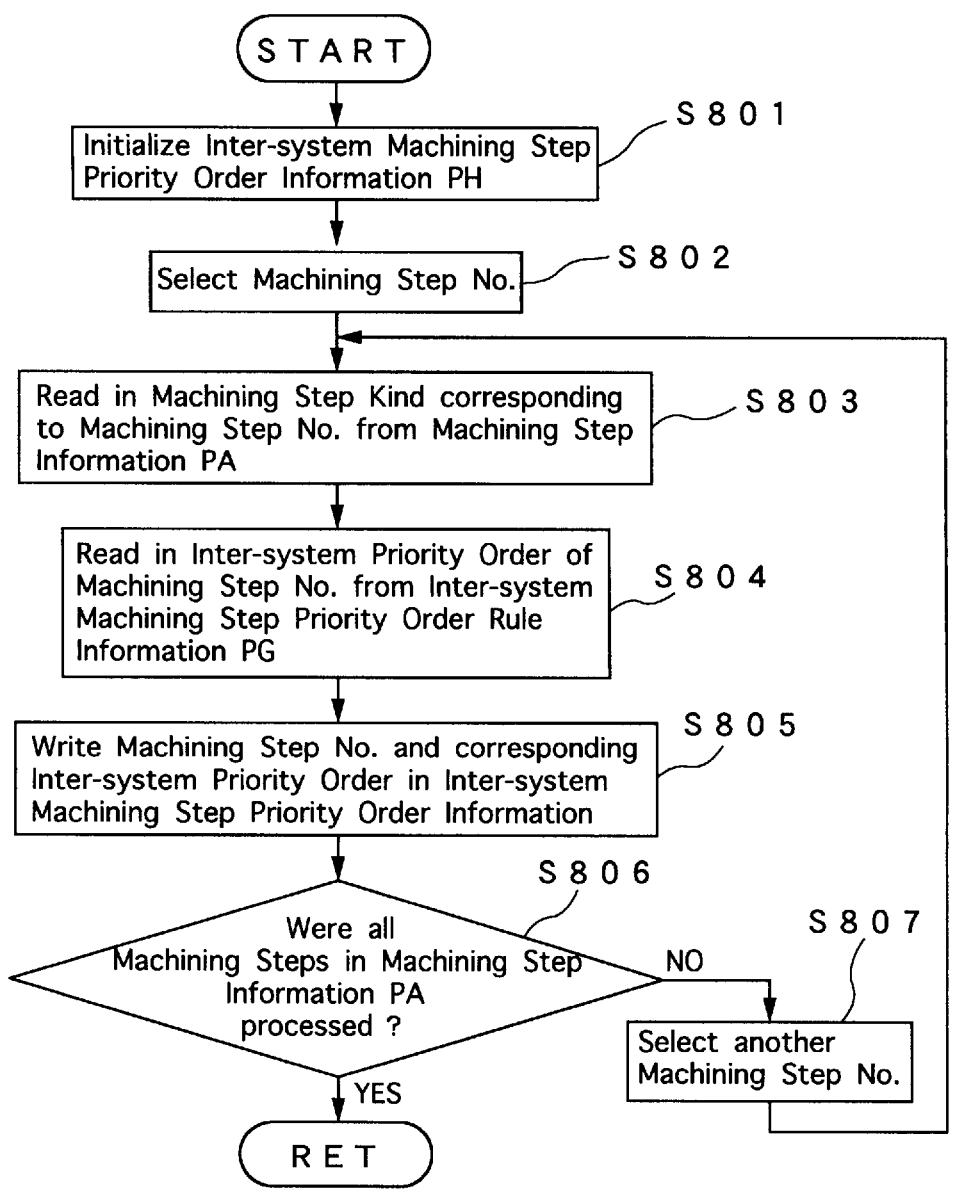
FIG. 53 is a flowchart showing an operation of an inter-system machining step priority order deciding unit according to the third embodiment of the invention.

FIGS. 47 and 48 show an operation of the in-system machining order deciding unit 32.

In step S701, the in-system machining order information PF is cleared for initialization. In step the deciding unit 32 selects one working system number from the working system information PE. In step S703, one machining step number and its working system number are read in from the working system information PE.

In step S704, it is decided whether or not the read-in working system number is the same as the currently selected working system number. If not, the execution proceeds to step S710 described later. If they are the same, the execution proceeds to step S705 and the deciding unit 32 reads in the in-system priority order corresponding to the machining step number from the in-system machining step priority order information PC. Then, it is decided if the in-system machining order information PF is empty or not in step S706. If empty, the deciding unit 32 writes in the read-in machining step number and its in-system priority order at the top of the in-system machining order information PF in step S707. On the other hand, if not empty, the deciding unit 32 compares the in-system priority order of the read-in machining step number with the in-system priority order of the machining step number already set in the in-system machining order information PF.

In step S709, the deciding unit 32 writes the read-in machining step number and in-system priority order in front of a machining step number which has a lower in-system priority order than the in-system priority order of the read-in machining step number. If there are plural machining step numbers of the same priority order, one of the rules of the machining order rule information PD is adopted as shown in FIG. 36. Then, the read-in machining step number and in-system priority order are written in a predetermined position in the in-system machining order information PF. If there are no machining step number of a lower in-system priority order than the in-system priority order of the read-in machining step number, the read-in machining step number and in-system priority order are written at the end of the in-system machining order information PF.

For example, where the working system number "1" and the machining step number "1" are selected from the working system information PE of FIG. 35 in the first instance, the data in the in-system machining order information PF is formed by referring to the machining step information PA of FIG. 32 and the in-system machining step priority order rule information PB of FIG. 33. Thereby, it becomes an in-system machining order information PF1 shown in FIG. 49. Next, if the machining step number "2" is selected from the working system information PE, the working system number allocated therefor is "2" and different from the present one. Then, a next machining step number "3" is selected. The working system number allocated for the machining step number "3" is "1" and the same as the present one. Accordingly, the in-system priority order of the machining step number "3" is compared with the in-system priority order of the machining step number "1" already written in the in-system machining order information PF1. Since the machining step kind of the machining step "3" is "drilling", the in-system priority order of the machining step number "3" is "3" by referring to the in-system machining step priority order rule information PB and equal to the in-system priority order of the machining step number "1". Then, a rule of the machining order rule information PD is adopted to decide a machining order between the machining step numbers "1" and "3". If the rule number "1" is adopted, the machining step number "1" is given priority to the machining step number "3". Therefore, the machining step number "3" is written after the machining step number "1". The resulting in-system machining order information PF2 is shown in FIG. 50.

Then, if the machining step number "4" is selected from the working system information PE, the working system number allocated therefor is "1" and equal to the present one. Then, the priority order of the machining step number "4" is compared with the priority order of the machining step numbers "1" and "3" already written in the in-system machining order information PF2. Since the machining step kind of the machining step "4" is "grooving", the priority order of the machining step number "4" is "2" by referring to the in-system machining step priority order rule information PB. Namely, it is preferred to the priority order of the machining step number "1". Therefore, the machining step number "4" of the higher priority order is written before the machining step number "1". The resulting in-system machining order information PF3 is shown in FIG. 51. Namely, the in-system machining order information PF is produced as mentioned above.

In step S710, it is decided if all the machining steps in the working system information PE were processed or not. If not, the execution returns to step S703. On the other hand, if all steps were processed, the execution proceeds to step S711, and it is decided if all the working systems were processed or not. If not, the execution returns to step S702. If all the systems were processed, the execution proceeds to step S712, and the order of the machining step numbers in the working system information PE is changed in the same order as that of the prepared in-system machining order information JF. At the same time, the order of the working system numbers in the working system information PE is changed accordingly. Thus, the working system information PE1 is generated as shown in FIG. 52. In this working system information PE1, the machining step numbers "2", "5" and "6" were processed in the same manner as the machining step numbers "1", "3" and An operation of the inter-system machining step priority order deciding unit 33 is described hereunder referring to the flowchart of FIG. 53.

In step S801, the inter-system machining step priority order information PH is initialized. In step S802, one machining step number is selected from the machining step information PA. In step S803, the deciding unit 33 reads in a machining step kind corresponding to the selected machining step number from the machining step information PA, For example, the machining step number "1" has the machining step kind "drilling", and the machining step number "4" has the machining step kind "grooving".

In step S804, the inter-system priority order of the selected machining step kind is read out from the inter-system machining step priority order rule information PG. In step S805, the deciding unit 33 writes the machining step number and the inter-system priority order corresponding thereto in the inter-system machining step priority order information PH. In step S806, it is decided whether or not all the machining step numbers were processed in the machining step information PA. If not, another machining step number is selected in step S807, and the execution returns to step S803. On the other hand, if all the machining step numbers were processed, the routine is ended. Thus, the relation between the machining step number and the inter-system priority order is definitely decided.

Figure 54:
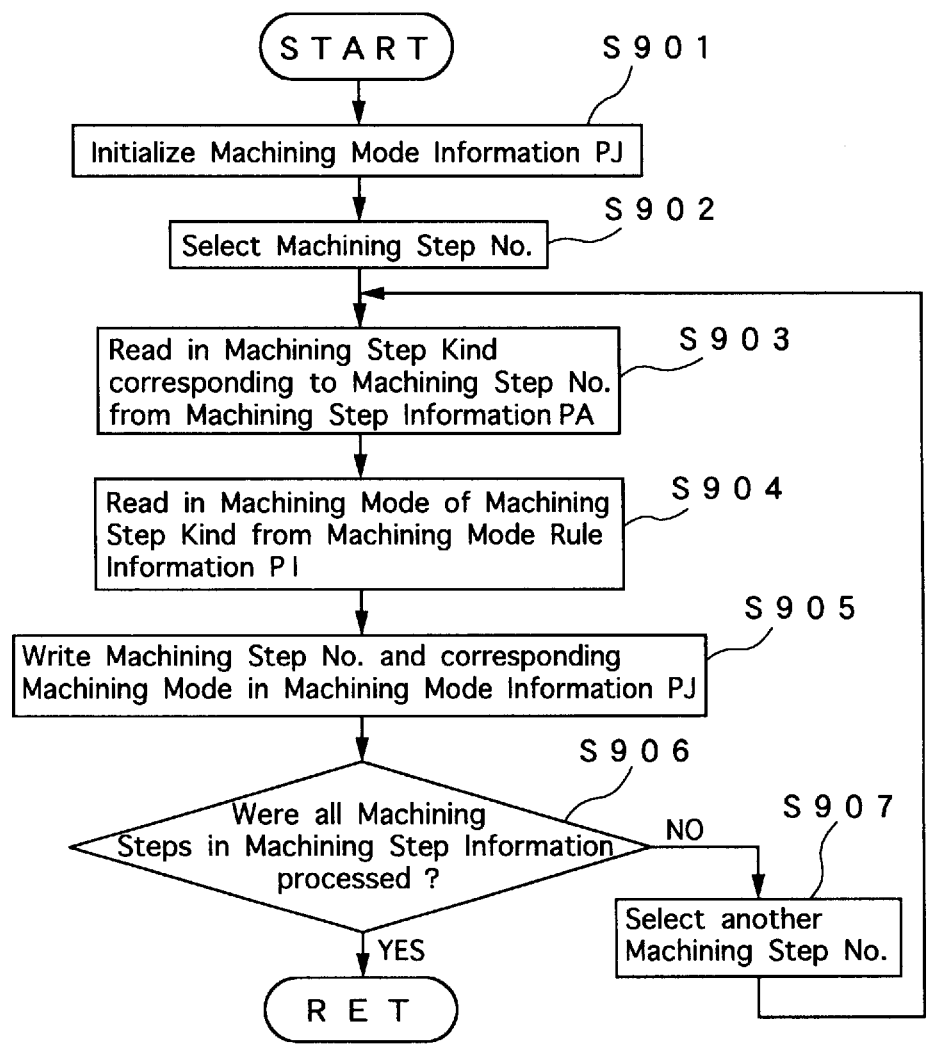
FIG. 54 is a flowchart showing an operation of a machining mode deciding unit according to the third embodiment of the invention.

An operation of the machining mode deciding unit 34 is described hereunder referring to the flowchart of FIG. 54.

In step S901, the machining mode information PJ is initialized. In step S902, one machining step number is selected from the machining step information PA. In step S903, the deciding unit 34 reads in a machining step kind corresponding to the selected machining step number from the machining step information PA. For example, the machining step number "1" has the machining step kind "drilling", and the machining step number "4" has the machining step kind "grooving".

In step S904, the machining mode of the selected machining step kind is read out from the machining mode rule information PI. In step S905, the deciding unit 34 writes the machining step number and the machining mode corresponding thereto in the machining mode information PJ. In step S906, it is decided whether or not all the machining step numbers were processed in the machining step information PA. If not, another machining step number is selected in step S907, and the execution returns to step S903. On the other hand, if all the machining step numbers were processed, the routine is ended. Thus, the relation between the machining step number and the machining mode is definitely decided.

Figure 55:
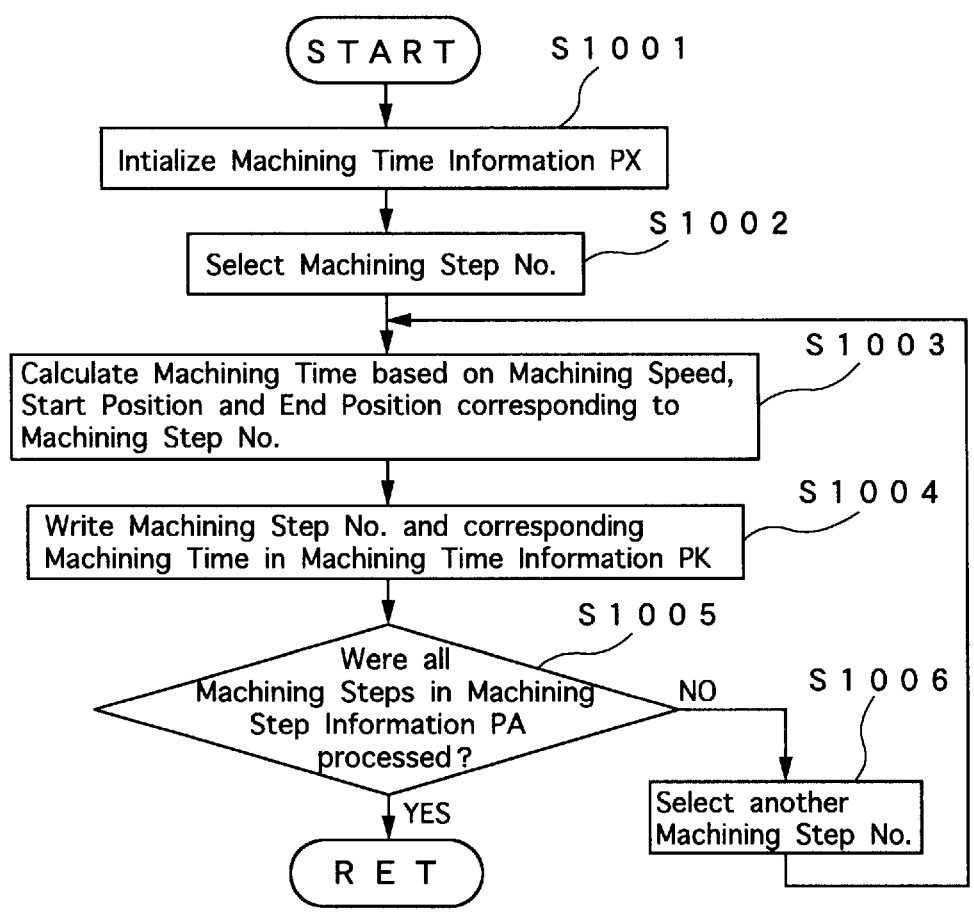
FIG. 55 is a flowchart showing an operation of a machining time calculating unit according to the third embodiment of the invention.
Figure 56:
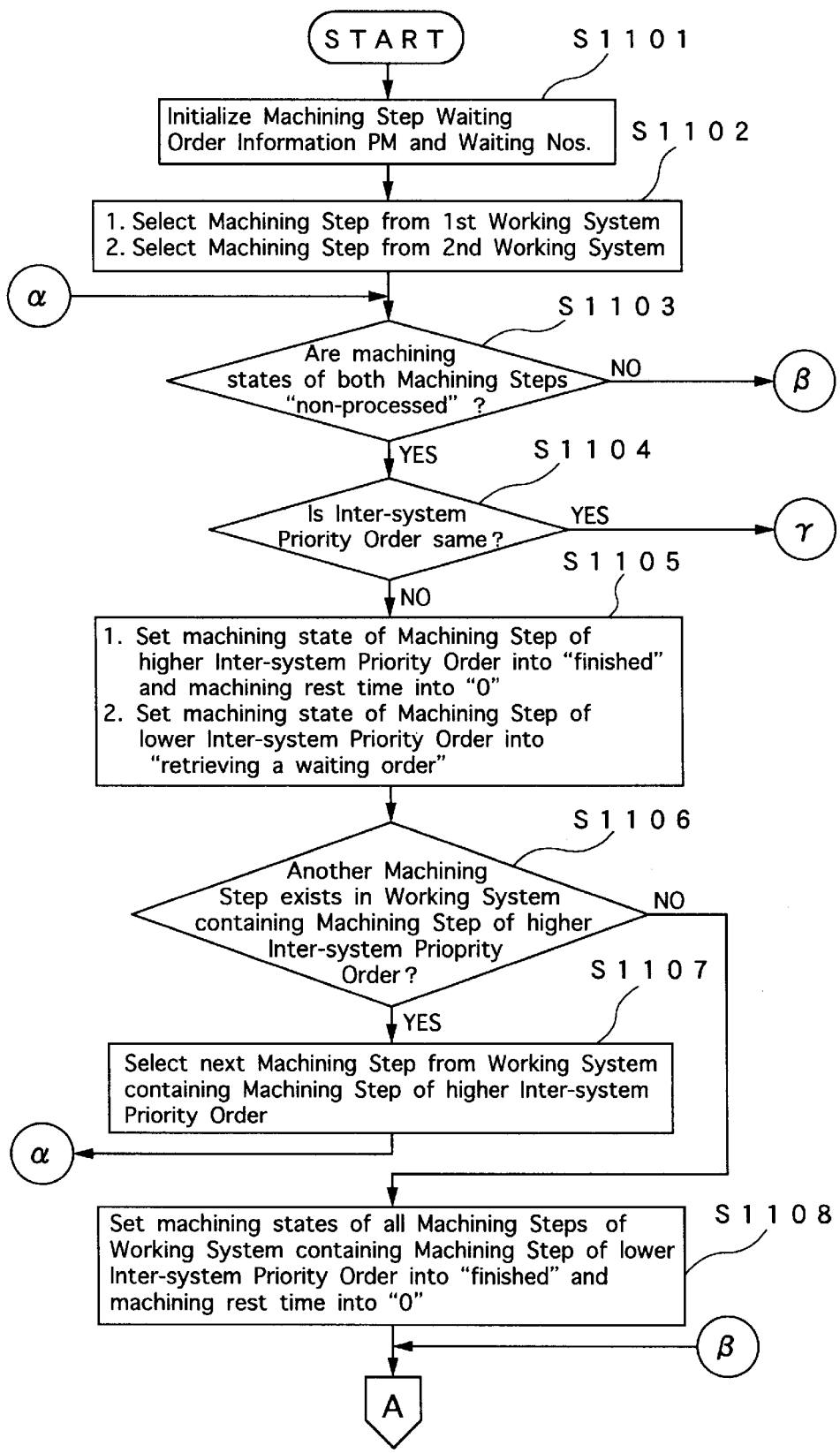
FIG. 56 to 61 are flowcharts showing an operation of a inter-system waiting order deciding unit according to the third embodiment of the invention.
Figure 57:
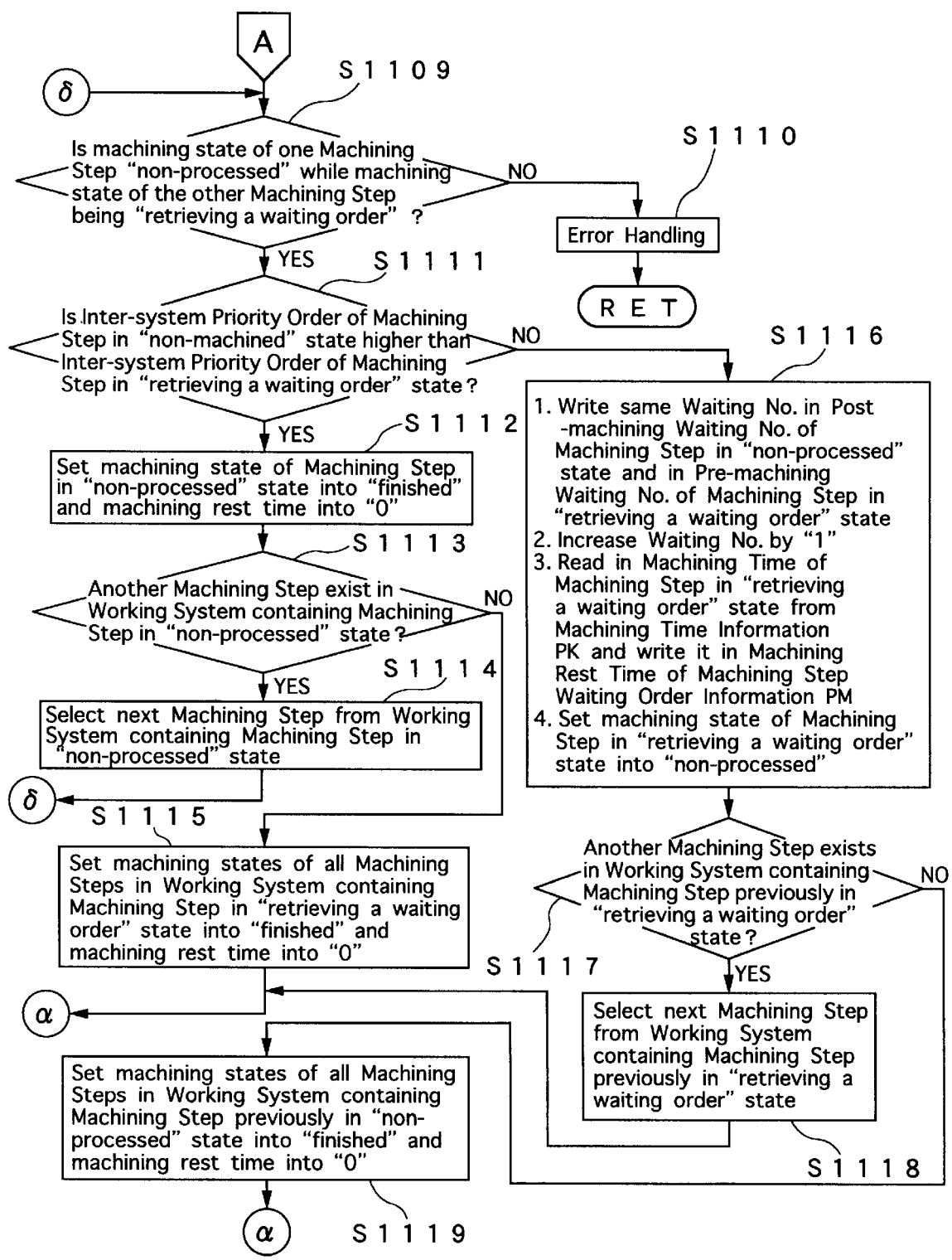
Figure 58:
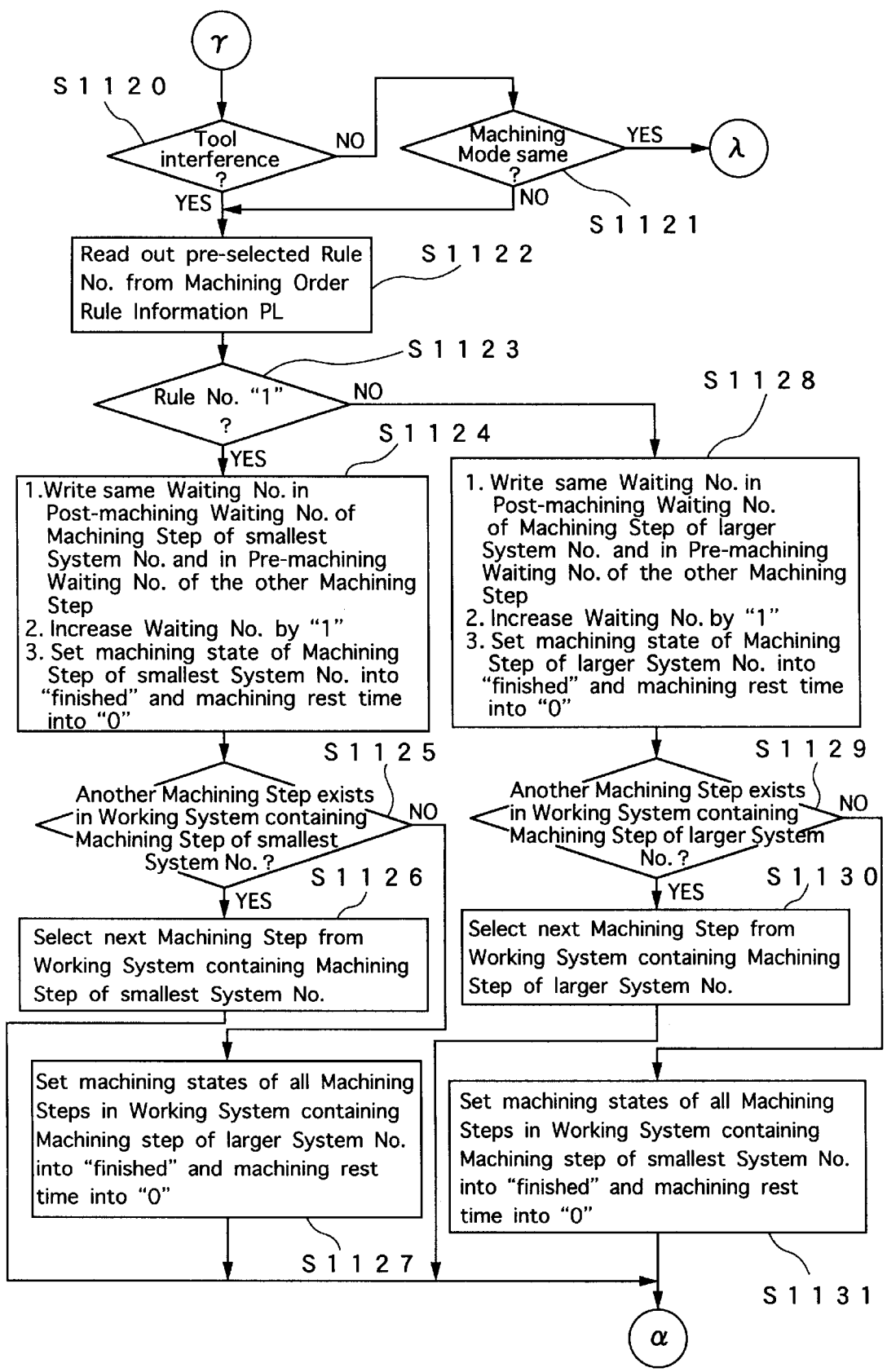
Figure 59:
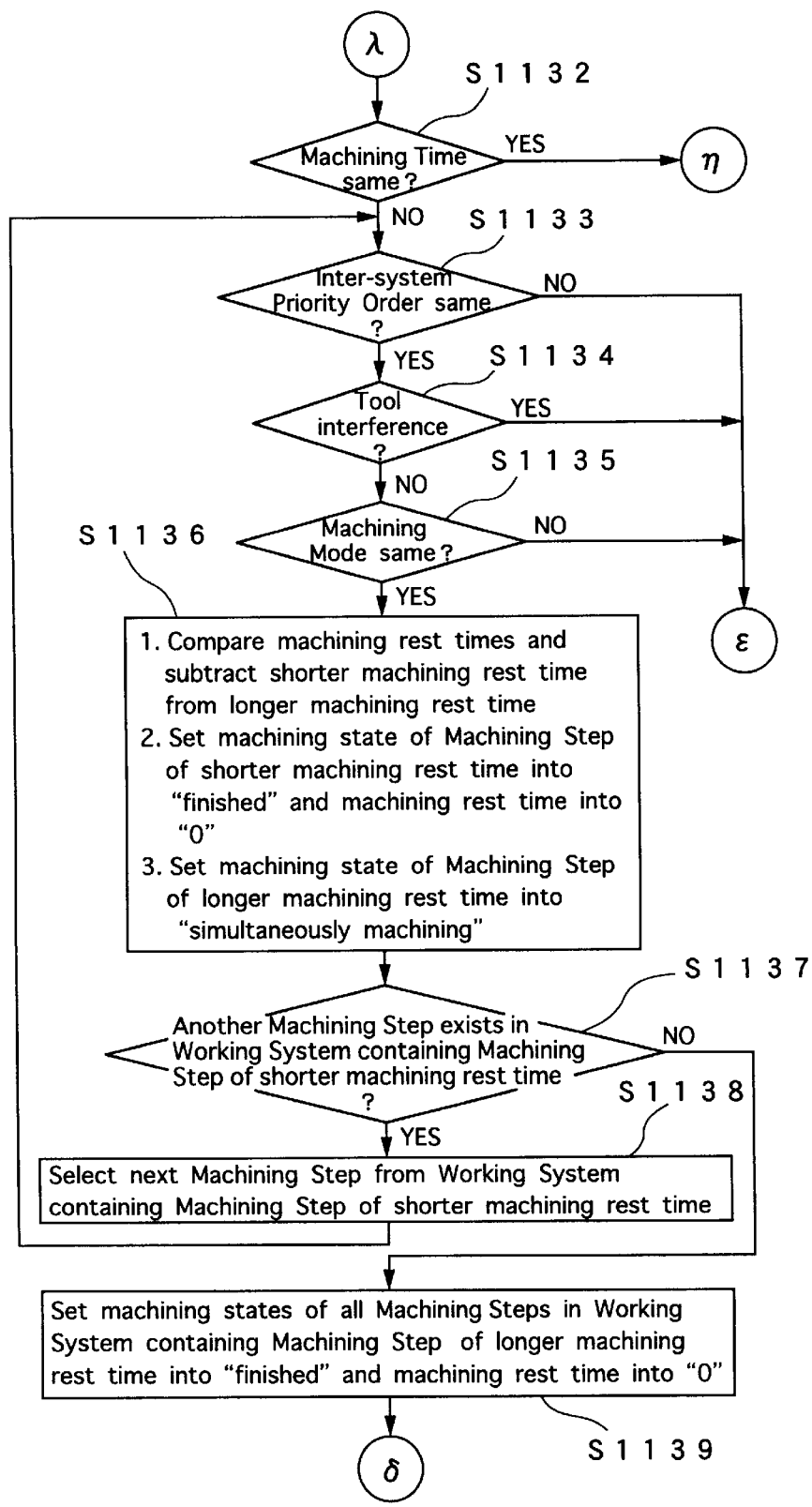
Figure 60:
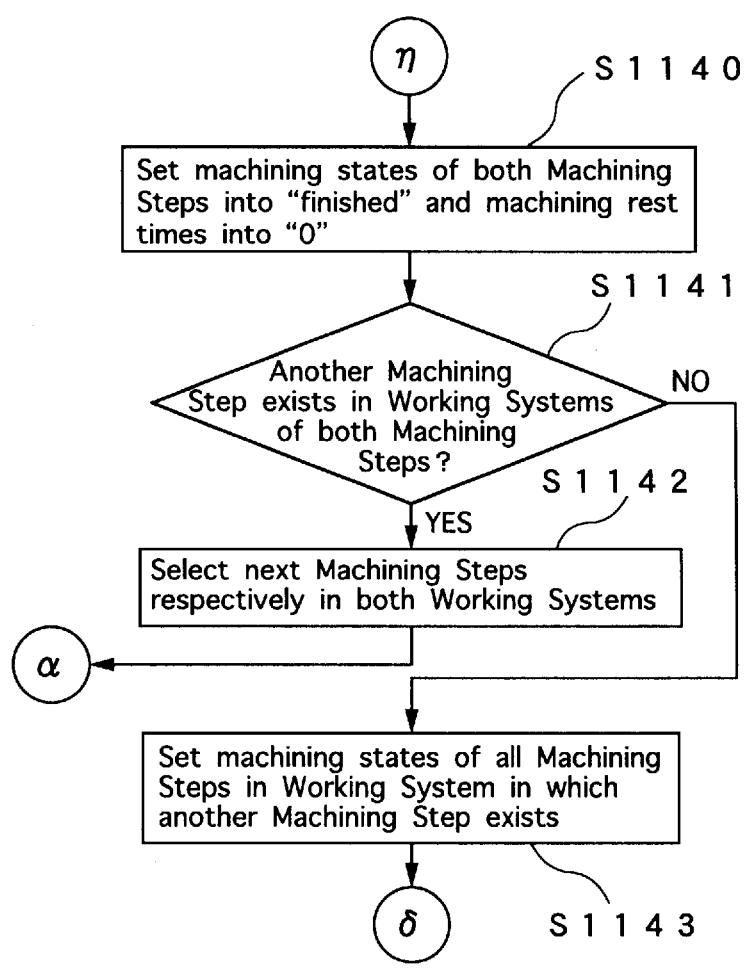
Figure 61:
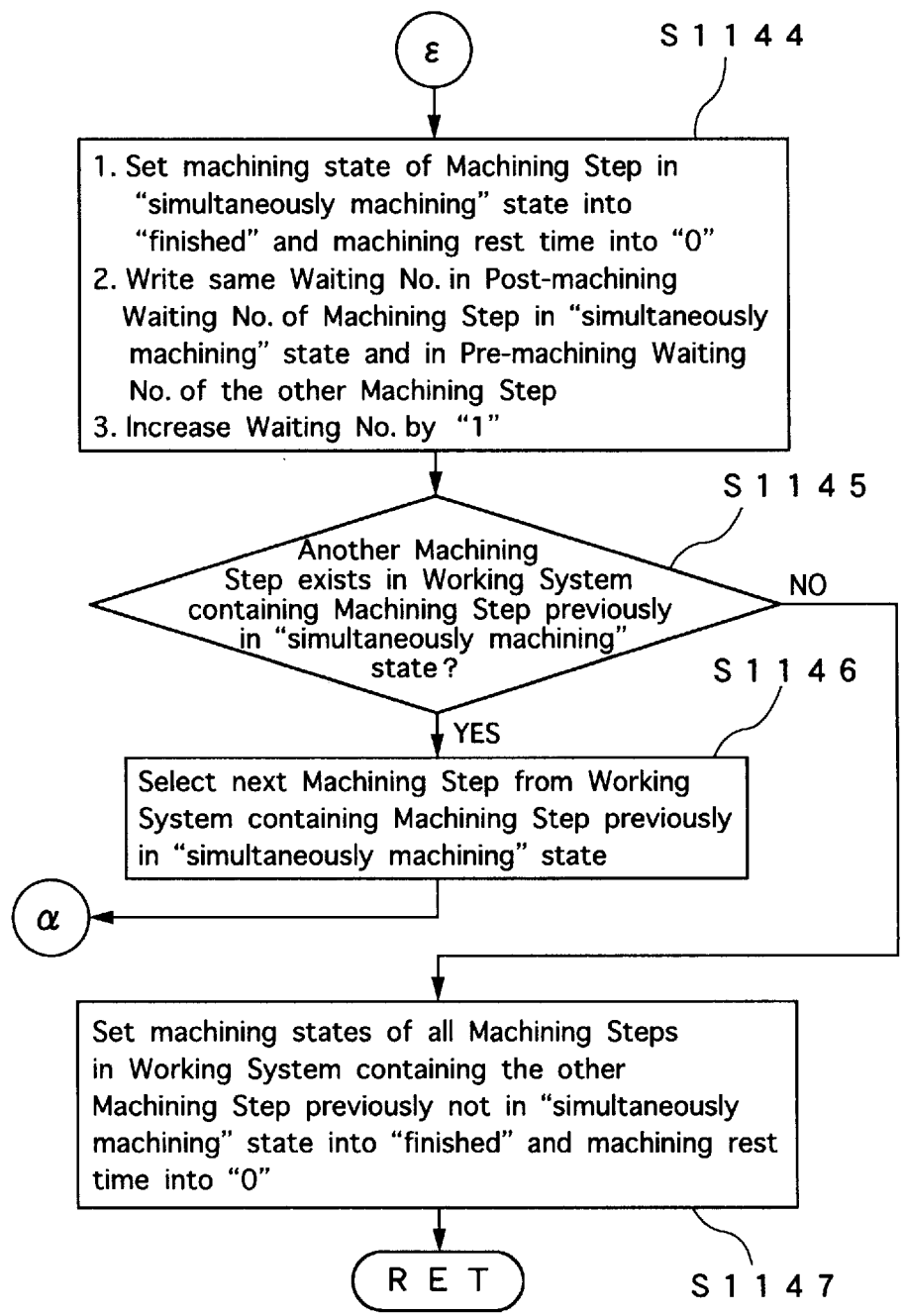

An operation of the machining time calculating unit 35 is described hereunder referring to the flowchart of FIG. 55.

In step S1001, the machining time information PK is initialized. In step S1002, one machining step number is selected from the machining step information PA. In step S1003, the calculating unit 35 reads in a machining speed, start position and end position corresponding to the selected machining step number from the machining step information PA, Then, the calculating unit 35 calculates the machining time based the read-in data.

In step S1004, the calculating unit 35 writes the machining step number and the machining time corresponding thereto in the machining time information PK. In step S1005, it is decided whether or not all the machining step numbers were processed in the machining step information PA. If not, another machining step number is selected in step S1006, and the execution returns to step S1003. On the other hand, if all the machining step numbers were processed, the routine is ended. Thus, the relation between the machining step number and the machining time is definitely decided.

An operation of the inter-system waiting order deciding unit 36 is described referring to FIGS. 56–61.

First, the machining step waiting order information PM and the waiting numbers are initialized, respectively, in step 1101. In order to initialize the machining step waiting order information PM, the waiting order deciding unit 36 reads in a machining step number and a working system number from the working system information PE1. Thereby, the deciding unit 36 writes them in the machining step waiting order information PM as they are. Next, in step S1102, the deciding unit 36 selects a machining step from the working system "1" in the working system information PE1 while selecting a machining step from the working system "2" in the working system information PE1. In step 1103, it is decided whether or not both the machining steps have a machining state of "non-processed". If both of them are in the machining state of "non-processed", the execution proceeds to step S1104. If not, the execution proceeds to step S1109. In step S1104, it is decided whether or not the selected machining steps have the same inter-system priority order. If their inter-system priority orders are the same, the execution proceeds to step S1120. If not the same, the execution proceeds to step S1105. In step S1105, the deciding unit 36 sets the machining state of the machining step having a higher inter-system priority order in "finished" while setting its machining rest time in "0". At the same time, the deciding unit 36 sets the machining state of the machining step having a lower inter-system priority order in "retrieving a waiting order". In step S1106, it is decided whether or not there exists another machining step in the one working system which contains the machining step of the higher inter-system priority order. If not, the execution proceeds to step S1108. If yes, the execution proceeds to step S1107. In step S1107, the deciding unit 36 selects a next machining step from the one working system. Then, the execution returns to step S1103. In step S1108, the deciding unit 36 sets the machining states of all the machining steps in the other working system which contains the machining step of the lower inter-system priority order in "finished", while setting the machining rest time thereof in "0". Then, the execution proceeds to step S1109.

In step S1109, it is decided whether or not one of the selected machining steps has the machining state of "non-processed" while the other having the machining state of "retrieving a waiting order". If yes, the execution proceeds to step S1111. If not, the execution proceeds to step S1110. In step S1110, an error is handled and the present routine is ended. In step S1111, it is decided whether or not the inter-system priority order of the one machining step in "non-processed" state is higher than the inter-system priority order of the other machining step in "retrieving a waiting order" state. If yes, the execution proceeds to step S1112. If not, the execution proceeds to step S1116. In step S1112, the deciding unit 36 sets the machining state of the one machining step from "non-processed" to "finished", while setting the "machining rest time" into "0". In step S1113, it is decided whether or not there exists another machining step in the one working system which contains the one machining step previously in "non-processed" state. If yes, the execution proceeds to step S1114. If not, the execution proceeds to step S1115. In step S1114, a next machining step is selected from the one working system. Then, the execution returns to step S1109. In step S1115, the deciding unit 36 sets the machining states of all the machining steps in the other working system which contains the other machining step into "finished", while setting their machining rest time into "0". Then, this routine is ended.

In step S1116, the deciding unit 36 writes the same waiting number as the post-machining waiting number of the one machining step in "non-machined" state and as the pre-machining waiting number of the other machining step in "retrieving a waiting order" state. Then, the deciding unit 36 increases the waiting number by "1". Next, the deciding unit 36 reads in the machining time of the other machining step from the machining time information PK, thereby storing it as a machining rest time. Moreover, the deciding unit 36 sets the machining state of the other machining step into "non-processed". In step S1117, it is decided whether or not there exists another machining step in the other working system containing the other machining step which was previously in the "retrieving a waiting order" state. If yes, the execution proceeds to step S1118. If not, the execution proceeds to step S1119. In step S1118, a next machining step is selected from the other working system. Then, the routine returns to step S1103. In step S1119, the deciding unit 36 sets the machining state of all the machining steps of the other working system into "finished", while setting their machining rest time into "0". Then, the routine returns to step S1103.

In step S1120, it is decided whether or not there is a possibility that the tools interfere with each other. If not, the execution proceeds to step S1121. If yes, the execution proceeds to step S1122. In step S1121, it is decided whether or not the machining modes of the two machining steps are the same. If the same, the execution proceeds to step S1132. If not the same, the execution proceeds to step S1122. In step S1122, the deciding unit 36 reads out the rule number of the machining order information PL which was already selected. In step S1123, it is decided whether or not the read-out rule number is "1". If it is "1", the the execution proceeds to step S1124. If it is not "1", the execution proceeds to step S1128. In step S1124, the deciding unit 36 writes the same waiting number as the post-machining waiting number of the one machining step having the smallest system number and as the pre-machining waiting number of the other machining step. Then, the deciding unit 36 increases the waiting number by "1". Thereafter, the deciding unit 36 sets the machining state of the one machining step into "finished", while setting its machining rest time into "0". In step S1125, it is decided whether or not there exists another machining step in the one working system containing the one machining step. If yes, the execution proceeds to step S1126. If not, the execution proceeds to step S1127. In step S1126, a next machining step is selected from the one working system. Then, the execution returns to step S1103. In step 1127, the deciding unit 36 sets the machining state of all the machining steps included in the other working system which contains the other machining step having the larger system number into "finished", while setting its machining rest time into "0". Then, the execution returns to step S1103.

In step S1128, the deciding unit 36 writes the same waiting number as the post-machining waiting number of the one machining step having the largest system number and as the pre-machining waiting number of the other machining step. Then, the deciding unit 36 increases the waiting number by "1". Thereafter, the deciding unit 36 sets the machining state of the one machining step into "finished", while setting its machining rest time into "0". In step S1129, it is decided whether or not there exists another machining step in the one working system containing the one machining step. If yes, the execution proceeds to step S1130. If not, the execution proceeds to step S1131. In step S1130, a next machining step is selected from the one working system. Then, the execution returns to step S1103. In step 1131, the deciding unit 36 sets the machining state of all the machining steps included in the other working system which contains the other machining step having the smallest system number into "finished", while setting its machining rest time into "0". Then, the execution returns to step S1103.

In step S1132, it is decided whether or not the machining times are the same. If the same, the execution proceeds to step S1140. If not the same, the execution proceeds to step S1133. In step S1133, it is decided whether or not the inter-system priority orders are the same. If the same, the execution proceeds to step S1134. If not the same, the execution proceeds to step S1144. In step S1134, it is decided whether or not there exists a tool interference. If yes, the execution proceeds to step S1144. If not, the execution proceeds to step S1135. In step S1135, it is decided whether or not the machining modes are the same. If the same, the execution proceeds to step S1136. If not the same, the execution proceeds to step S1144. In step S1136, the machining rest times are compared, and the shorter machining rest time is subtracted from the longer machining rest time. Then, the deciding unit 36 sets the machining state of the one machining step having the shorter machining rest time into "finished", while setting its machining rest time into "0". Thereafter, the deciding unit 36 sets the machining state of the other machining step having the longer machining rest time into "simultaneously machining". In step S1137, it is decided whether or not there exists another machining step in the one working system containing the one machining step. If yes, the execution proceeds to step S1138. If not, the execution proceeds to step S1139. In step S1138, a next machining step is selected from the one working system. Then, the execution proceeds to step S1133. In step S1139, the deciding unit 36 sets the machining state of all the machining steps of the other working system containing the other machining step having the longer machining rest time into "finished", while setting its machining rest time into "0".

In step S1140, the machining states of both the machining steps are set in "finished, while their machining rest times being set into "0". In step S1141, it is decided whether or not there exist other machining steps in any one of the working systems respectively allocated for the two machining steps. If yes, the execution proceeds to step S1142. If not, the execution proceeds to step S1143. In step S1142, a next machining step is selected from each of the working systems, if both the working systems have other machining steps remained untreated. Then, the execution proceeds to step S1103. In step S1143, the deciding unit 36 sets the machining states of all the machining steps of the working system in which the other machining step is remained untreated into "finished", while setting their machining rest time into "0". Then, the execution proceeds to step S1103.

After proceeding to step S1144 from step S1133, S1134 or S1135, in step S1144, the deciding unit 36 sets the machining state of the machining step now in the "simultaneous machining" state into "finished, while setting its machining rest time into "0". Then, the deciding unit 36 writes the same waiting number as the post-machining waiting number of the one machining step in "simultaneous machining" state and as the pre-machining waiting number of the other machining step. Thereafter, the deciding unit 36 increases the waiting number by "1". In step S1145, it is decided whether or not there exists another machining step in the one working system containing the one machining step previously in the "simultaneous machining" state. If yes, the execution proceeds to step S1146. If not, the execution proceeds to step S1147. In step S1146, a next machining step is selected from the one working system. Then, the execution proceeds to step S1103. In step S1147, the deciding unit 36 sets the machining states of all the machining steps of the other working system containing the other machining step which was not in the "simultaneous machining" state into "finished", while setting their machining rest time into "0". Then, this routine is ended.

Figure 62:
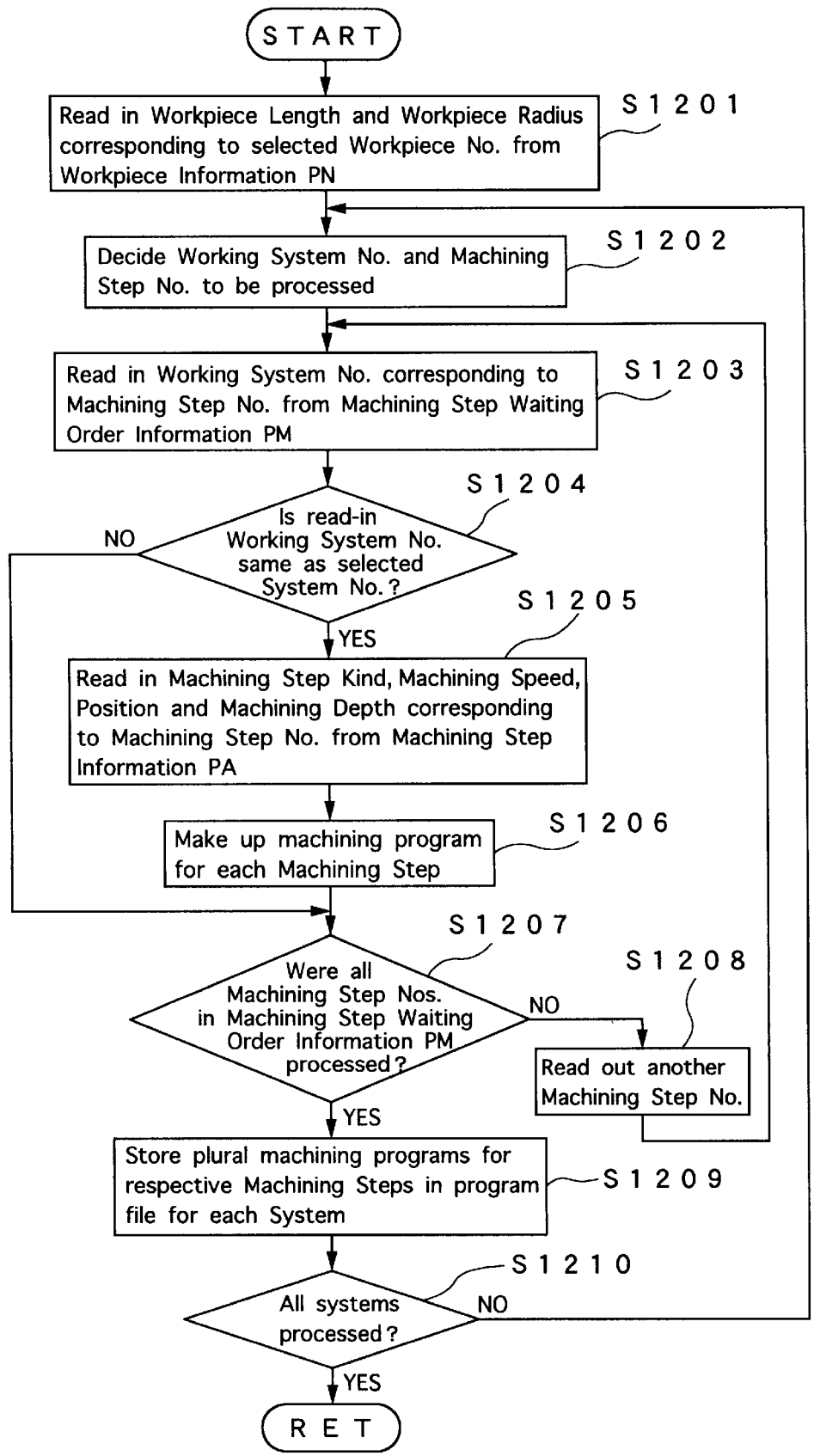
FIG. 62 is a flowchart showing an operation of a machining program control unit according to the third embodiment of the invention.
Figure 67:
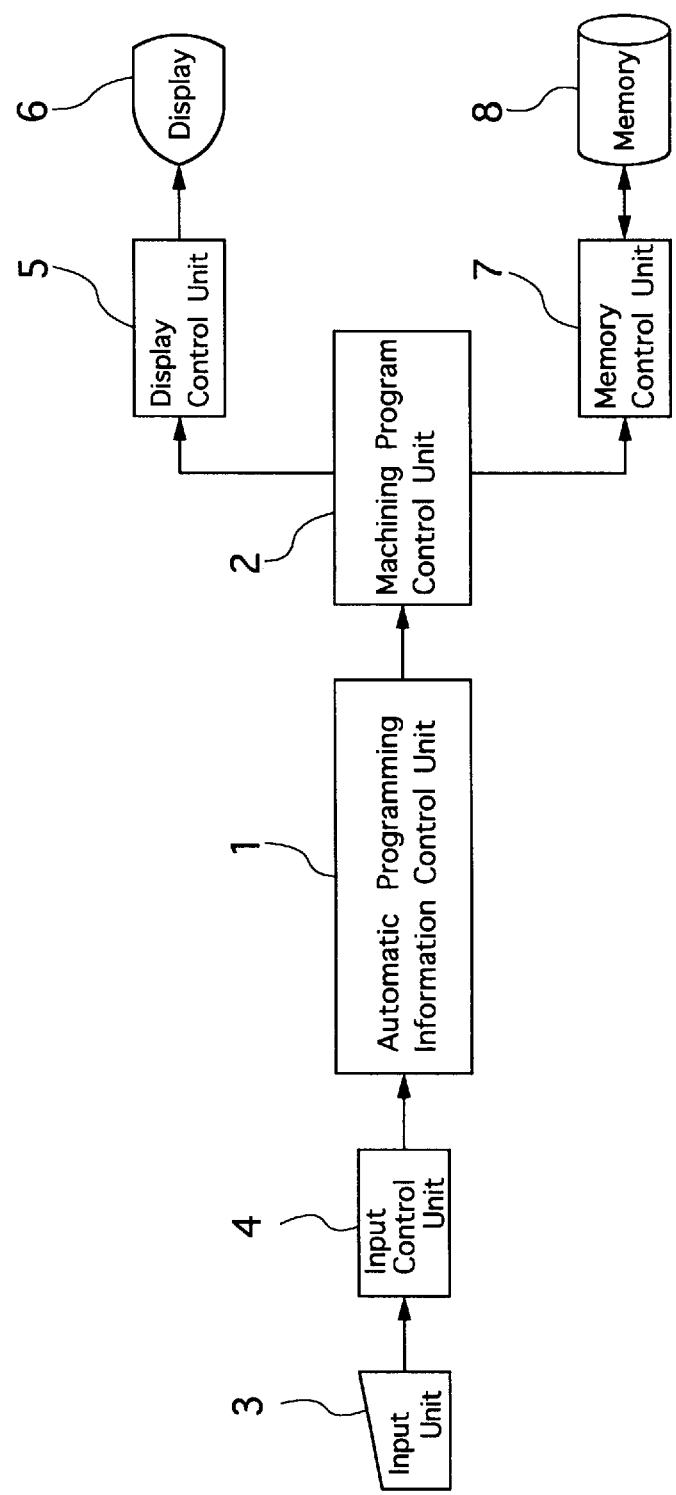
FIG. 67 is a block diagram showing an automatic programming device for multi-system machine tool in the related art.

An operation of the machining program control unit 2 is described hereunder referring to the flowchart shown in FIG. 62, wherein a machining program is generated for each system.

FIG. 62 shows an operation of the machining program control unit 2. FIG. 63 exemplifies a machining step program for drilling according to the third embodiment. FIG. 64 exemplifies a machining step program for cutting-off according to the third embodiment. FIG. 65 exemplifies a program of the working system "1" collecting plural machining step programs according to the third embodiment. FIG. 66 exemplifies a program of the working system "2" collecting plural machining step programs according to the third embodiment.

First, in step S1201, the control unit 2 reads in a length and a radius of a workpiece corresponding to a workpiece number which has been selected beforehand from the workpiece information PN. Then, the control unit 2 decides a system number and a machining step number to be processed in step S1202. In step S1203, the control unit 2 reads in a working system number corresponding to the machining step number from the machining step waiting order information PM. In step S1204, it is decided whether or not the read-out system number is the same as the system number currently being processed. If not the same, the execution proceeds to step S1207. If the same, the execution proceeds to step S1205, and the control unit 2 reads out the machining step kind, a machining speed, a position and a machining depth corresponding to that machining step number from the machining step information PA. Thereafter, the control unit 2 makes up a machining program for each machining step.

For instance, FIG. 63 shows an example of a program for drilling of the machining step number "1" and the working system number "1". With this program, a cylindrical workpiece of a radius "40" chucked on a lathe has its outer peripheral surface bored with a hole of a depth "12" at a position of "350" in the Z-direction from an origin. On the other hand, FIG. 64 shows an example of a program for cutting-off of the machining step number "6" and the working system number "1". With this program, a cylindrical workpiece of a radius "40" chucked on a lathe is cut off at a position of "10" in the Z-direction from an origin.

In step S1207, it is decided whether or not all the machining step numbers were processed in the machining step waiting order information PM. If not, another machining step number is read out in step S1208, and the execution returns to step S1203. On the other hand, if the processing was completed for all the machining steps, the execution proceeds to step S1209, and a plurality of machining programs for respective machining steps are stored in a program file for each system. Namely, the machining programs for plural machining steps contained in the same working system number are collected in one group.

For example, in case of the machining step waiting order information PM of FIG. 44, the working system number "1" contains therein the machining steps number "4", "1" and "3". Then, the machining program for the machining step number "4", the machining program for the machining step number "1" (see FIG. 63) and the machining program for the machining step number "2" are gathered as a machining program for the working system number "1", as shown in FIG. 65. Similarly, the working system number "2" contains therein the machining steps number "5", "2" and "6". Then, the machining program for the machining step number "5", the machining program for the machining step number "2" and the machining program for the machining step number "6" (see FIG. 64) are gathered as a machining program for the working system number "2", as shown in FIG. 66.

Specifically, the programming device or method according to the third embodiment determines the waiting order after judging the machining order or judging if there is a possibility of tool interference or not. Moreover, it determines the waiting order after deciding if the machining modes are suitable for simultaneous machining or not in step S709, for example. Therefore, even an unskilled operator can disregard important and difficult questions such as judgement of the machining order, tool interference possibility and machining mode applicability to the simultaneous machining.

In addition, the the programming device or method automatically generates the machining program for each working system on the basis of the waiting order information.

In conclusion, according to the third embodiment, it is possible to automatically determine a machining order of plural machining steps in the same machining system. Moreover, it is possible to automatically determine a waiting order between plural systems. Thereby a machining program can be generated for each system. Accordingly, the operator can input information about machining steps disregarding the waiting order. Namely, the operator is free from such a difficult work conventionally required, so that the burden on the operator is very much lightened. As a result, it is possible to highly improve productivity of the multi-system machining program.

The preferred embodiments described herein are illustrative and not restrictive, the scope of the invention being indicated in the appended claims and all variations which come within the meaning of the claims are intended to be embraced therein.

I claim:

1. An automatic programming method for a multi-system machining tool, for machining one of a predetermined number of workpieces by predetermined machining steps with at least one of predetermined machining systems, comprising:

a workable system deciding step for deciding a machining system workable for each of the predetermined machining steps, among the predetermined machining systems, on the basis of at least machining step information, workpiece information, tool information and machining step corresponding workpiece information;

the machining step information defining a machining step kind and a machining specification for each of the predetermined machining steps;

the workpiece information defining a workpiece material and a workpiece shape for each of the predetermined workpieces;

the tool information defining a specification of a tool used in each of the predetermined machining systems, a machining step kind workable by the tool and a workpiece material workable by the tool; and the machining step corresponding workpiece information defining a workpiece used in each of the predetermined machining steps; and a working system deciding step for deciding a machining system for actually working on one of the predetermined machining steps when there are plural workable machining systems for the one machining step on the basis of a system priority rule information;

the system priority rule information defining a preferred machining system when there are plural workable machining systems for one of the predetermined machining steps.

2. An automatic programming method according to claim 1, further comprising a tool-and-workpiece deciding step for deciding a tool and a workpiece used in each of the predetermined machining steps, when plural tools are used in the actually working machining system while plural workpieces are usable in the machining step among the predetermined workpieces, simultaneously with the working system deciding step.

3. An automatic programming method according to claim 2, further comprising a program generating step for generating a machining program for each of the actually working machining systems on the basis of an information about the machining system decided in the working system deciding step and an information about the tool and the workpiece decided in the tool-and-workpiece deciding step.

4. An automatic programming method according to claim 1, further comprising:

a machining order deciding step for deciding a machining order of plural machining steps having a same priority order and being performed by a same actually working machining system on the basis of a machining step priority order rule information and a machining order rule information;

the machining step priority order rule information defining a priority order for each of the machining step kinds so that each of the predetermined machining steps is given the priority of the machining step kind thereof; and the machining order rule information defining a machining order of plural machining steps when the plural machining steps have a same priority while being performed by a same actually working machining system.

5. An automatic programming method according to claim 4, further comprising a program generating step for generating a machining program for each of the actually working machining systems on the basis of an information about the machining order of the plural machining steps decided in the machining order deciding step.

6. An automatic programming device for a multi-system machining tool, for machining one of a predetermined workpieces by predetermined machining steps with at least one of predetermined machining systems, comprising:

workable system deciding means for deciding a machining system workable for each of the predetermined machining steps, among the predetermined machining systems, on the basis of at least machining step information, workpiece information, tool information and machining step corresponding workpiece information;

the machining step information defining a machining step kind and a machining specification for each of the predetermined machining steps;

the workpiece information defining a workpiece material and a workpiece shape for each of the predetermined workpieces;

the tool information defining a specification of a tool used in each of the predetermined machining systems, a machining step kind workable by the tool and a workpiece material workable by the tool; and the machining step corresponding workpiece information defining a workpiece used in each of the predetermined machining steps; and machining system assigning means for deciding a machining system for actually working on one of the predetermined machining steps when there are plural workable machining systems for the one machining step on the basis of an information outputted from the workable system deciding means and a system priority rule information;

the system priority rule information defining a preferred machining system when there are plural workable machining systems for one of the predetermined machining steps.

7. An automatic programming device according to claim 6, further comprising:

in-system machining order deciding means for deciding a machining order of plural machining steps having a same priority order and being performed by a same actually working machining system on the basis of a machining step priority order rule information and a machining order rule information;

the machining step priority order rule information defining a priority order for each of the machining step kinds so that each of the predetermined machining steps is given the priority of the machining step kind thereof; and the machining order rule information defining a machining order of plural machining steps when the plural machining steps have a same priority order while being performed by a same actually working machining system.

8. An automatic programming method for a multi-system machining tool, for machining one of predetermined workpieces by predetermined machining steps with predetermined machining systems, comprising:

an in-system priority order deciding step for deciding an in-system priority order corresponding to each of the predetermined machining steps on the basis of at least a machining step information and an in-system machining step priority order rule information;

the machining step information defining a machining step kind and a machining specification for each of the predetermined machining steps;

the in-system machining step priority order rule information defining the in-system priority order for the machining step kind of each of the predetermined machining steps:

an in-system machining order deciding step for deciding an in-system machining order between machining steps handled by a same machining system, on the basis of a first machining order rule information and a working system information;

the first machining order rule information defining a preferred machining step if there are plural machining steps having the same in-system priority order;

the working system information defining machining systems for actually working on the predetermined machining steps, respectively;

an inter-system priority order deciding step for deciding an inter-system priority order corresponding to each of the predetermined machining steps on the basis of the machining step information and an inter-system machining step priority order rule information;

the inter-system machining step priority order rule information defining the inter-system priority order for the machining step kind of each of the predetermined machining steps;

a machining time calculating step for calculating a machining time for each of the predetermined machining steps on the basis of the machining step information; and a waiting order deciding step for deciding a waiting order between machining steps handled by different machining system on the basis of the machining step information, the in-system machining order decided in the in-system machining order deciding step, the inter-system priority order decided in the inter-system machining step priority order deciding step, a second machining order rule information and the machining time decided in the machining time calculating step;
the second machining order rule information defining a preferred machining step if there are plural machining steps having the same inter-system priority order.

9. An automatic programming method according to claim 8, in which the waiting order deciding step decides the waiting order further on the basis of a decision whether or not there is an interference between tools.

10. An automatic programming method according to claim 8, in which the waiting order deciding step decides the waiting order further on the basis of a decision whether or not the machining steps have machining modes machinable simultaneously with each other.

11. An automatic programming method according to claim 8, further generating a machining program for each of the actually working machining system on the basis of the waiting order decided in the waiting order deciding step.

12. An automatic programming device for a multi-system machining tool, for machining one of predetermined workpieces by predetermined machining steps with predetermined machining systems, comprising:

an in-system machining step priority order deciding unit for deciding an in-system priority order corresponding to each of the predetermined machining steps on the basis of at least a machining step information and an in-system machining step priority order rule information;
the machining step information defining a machining step kind and a machining specification for each of the predetermined machining steps;
the in-system machining step priority order rule information defining the in-system priority order for the machining step kind of each of the predetermined machining steps:

an in-system machining order deciding unit for deciding an in-system machining order between machining steps handled by a same machining system, on the basis of the in-system priority order decided by the in-system machining step priority order deciding unit, a first machining order rule information and a working system information;
the first machining order rule information defining a preferred machining step if there are plural machining steps having the same in-system priority order;
the working system information defining machining systems for actually working on the predetermined machining steps, respectively;

an inter-system machining step priority order deciding unit for deciding an inter-system priority order corresponding to each of the predetermined machining steps on the basis of the machining step information and an inter-system machining step priority order rule information;
the inter-system machining step priority order rule information defining the inter-system priority order for the machining step kind of each of the predetermined machining steps;

a machining mode deciding unit for deciding a machining mode corresponding to each of the predetermined machining steps on the basis of a machining mode rule information;
the machining mode rule information defining the machining mode for the machining step kind of each of the predetermined machining steps;

a machining time calculating unit for calculating a machining time for each of the predetermined machining steps on the basis of the machining step information; and an inter-system waiting order deciding unit for deciding a waiting order between machining steps handled by different machining systems on the basis of the machining step information, the working system information, the inter-system machining step priority order information, the machining time decided by the machining time calculating unit and a second machining order rule information;
the second machining order rule information defining a preferred machining step if there are plural machining steps having the same inter-system priority order.

* * * * *